(12) United States Patent
Ishikawa et al.

(10) Patent No.: US 8,549,021 B2
(45) Date of Patent: Oct. 1, 2013

(54) APPARATUS, METHOD, AND SYSTEM OF CONTROLLING SETTING INFORMATION FOR CONFIDENTIAL DOCUMENT

(75) Inventors: Masaaki Ishikawa, Tokyo (JP); Hiroshi Shimura, Yokosuka (JP)

(73) Assignee: Ricoh Company, Limited, Tokyo (JP)

( * ) Notice: Subject to any disclaimer, the term of this patent is extended or adjusted under 35 U.S.C. 154(b) by 408 days.

(21) Appl. No.: 12/479,225

(22) Filed: Jun. 5, 2009

(65) Prior Publication Data

US 2009/0304228 A1 Dec. 10, 2009

(30) Foreign Application Priority Data

Jun. 6, 2008 (JP) ................................. 2008-148871

(51) Int. Cl.
*G06F 17/30* (2006.01)
(52) U.S. Cl.
USPC .......................................................... 707/757
(58) Field of Classification Search
USPC ................................................. 707/757, 754
See application file for complete search history.

(56) References Cited

U.S. PATENT DOCUMENTS

| | | | |
|---|---|---|---|
| 2004/0184065 A1* | 9/2004 | Guan et al. ................... | 358/1.14 |
| 2005/0012940 A1 | 1/2005 | Matsuda | |
| 2005/0132045 A1 | 6/2005 | Hornback, Jr. et al. | |
| 2005/0135856 A1 | 6/2005 | Uchida et al. | |
| 2006/0221372 A1* | 10/2006 | Onishi et al. ................. | 358/1.13 |
| 2006/0256362 A1 | 11/2006 | Guan et al. | |
| 2007/0133038 A1 | 6/2007 | Otake et al. | |
| 2007/0297644 A1 | 12/2007 | Ishikawa et al. | |
| 2008/0018942 A1* | 1/2008 | Komiya ...................... | 358/3.28 |
| 2008/0166013 A1 | 7/2008 | Ishikawa et al. | |
| 2008/0232639 A1 | 9/2008 | Ishikawa et al. | |
| 2008/0232640 A1 | 9/2008 | Ishizu et al. | |

FOREIGN PATENT DOCUMENTS

| | | |
|---|---|---|
| CN | 1984219 A | 6/2007 |
| EP | 1 798 607 A2 | 6/2007 |
| EP | 1 798 607 A3 | 6/2007 |
| JP | 2006-74093 | 3/2006 |

OTHER PUBLICATIONS

Brassil, Jack T., et al. "Electronic marking and identification techniques to discourage document copying." Selected Areas in Communications, IEEE Journal on 13.8 (1995): 1495-1504.*
Matsumoto, Takeshi, et al. "Development and Verification of a Collaborative Printing Environment." Creating, Connecting and Collaborating through Computing, 2007. C5'07. The Fifth International Conference on. IEEE, 2007.*
U.S. Appl. No. 12/314,213, filed Dec. 5, 2008.
U.S. Appl. No. 12/320,504, filed Jan. 28, 2009.
U.S. Appl. No. 12/379,222, filed Feb. 17, 2009.

(Continued)

*Primary Examiner* — Usmaan Saeed
*Assistant Examiner* — Nan Hutton
(74) *Attorney, Agent, or Firm* — Oblon, Spivak, McClelland, Maier & Neustadt, L.L.P.

(57) ABSTRACT

An apparatus, method, and system of generating a confidential document by adding additional information to image data are described, each of which obtains administrator setting information set by an administrator, and user setting information set by a user. Information for display to the user is controlled based on at least the administrator setting information to satisfy the requirement set by the administrator setting information even when the user setting information differs from the administrator setting information.

14 Claims, 17 Drawing Sheets

(56) References Cited

OTHER PUBLICATIONS

U.S. Appl. No. 12/320,313, filed Jan. 23, 2009.
Office Action issued Nov. 11, 2010, in Chinese Patent Application No. 200910146578.7.
Office Action issued Jul. 13, 2011, in Chinese Patent Application No. 200910146578.7.
European Communication pursuant to Article 94(3) EPC issued Feb. 8, 2013, in Application No. 09 161 932.0-1228.

* cited by examiner

FIG. 6

| ADMINISTRATOR SETTING INFORMATION | | | USER SETTING INFORMATION | | |
|---|---|---|---|---|---|
| PATTERN ON/OFF | SETTING ITEM | VALUE | PATTERN ON/OFF | SETTING ITEM | VALUE |
| (A) OFF | ●CONTROL PATTERN<br>●DETERRENT PATTERN<br>●DETERRENT CHARACTERS<br>●PATTERN COLOR<br>●CONTROL CODE | NOT SET<br>NOT SET<br>NOT SET<br>NOT SET<br>NOT SET | (C) OFF | ●CONTROL PATTERN<br>●DETERRENT PATTERN<br>●DETERRENT CHARACTERS<br>●PATTERN COLOR<br>●CONTROL CODE | NOT SET<br>NOT SET<br>NOT SET<br>NOT SET<br>NOT SET |
| | | | (D) ON | ●CONTROL PATTERN<br>●DETERRENT PATTERN<br>●DETERRENT CHARACTERS<br>●PATTERN COLOR<br>●CONTROL CODE | NOT SET<br>SET<br>SET<br>SET<br>NOT SET |
| (B) ON | ●CONTROL PATTERN<br>●DETERRENT PATTERN<br>●DETERRENT CHARACTERS<br>●PATTERN COLOR<br>●CONTROL CODE | NOT SET<br>SET<br>NOT SET<br>NOT SET<br>NOT SET | (E) REQUIRED | ●CONTROL PATTERN<br>●DETERRENT PATTERN<br>●DETERRENT CHARACTERS<br>●PATTERN COLOR<br>●CONTROL CODE | NOT SET (ALLOWED)<br>SET (NOT ALLOWED)<br>SET (ALLOWED)<br>SET (ALLOWED)<br>NOT SET (ALLOWED) |

FIG. 11

| PATTERN ON/OFF | SETTING ITEM | VALUE | OTHER |
|---|---|---|---|
| ON<br>OFF<br>REQUIRED | CONTROL PATTERN | • SET<br>• NOT SET | CONTROL CODE<br>PATTERN COLOR<br>REQUIRED |
| | DETERRENT PATTERN | • SET<br>• NOT SET | DETERRENT CHARACTERS<br>PATTERN COLOR<br>REQUIRED |
| | DETERRENT CHARACTERS | • "COPY"<br>• "Confidential"<br>• "VOID"<br>• NOT SET | |
| | PATTERN COLOR | • BLACK<br>• CYAN<br>• MAGENTA<br>• NOT SET | |
| | CONTROL CODE | • 1<br>• 2<br>• 3<br>• NOT SET | 1 = COPY, TRANSMIT, STORE<br>2 = TRANSMIT, STORE<br>3 = TRANSMIT |

FIG. 18

| PATTERN ON/OFF | SETTING ITEM | VALUE | OTHER |
|---|---|---|---|
| ■ ON<br>□ OFF | CONTROL PATTERN | □ SET<br>■ NOT SET | CONTROL CODE PATTERN COLOR REQUIRED |
| | DETERRENT PATTERN | ■ SET<br>□ NOT SET | DETERRENT CHARACTERS PATTERN COLOR REQUIRED |
| | DETERRENT CHARACTERS | □ "COPY"<br>□ "Confidential"<br>□ "VOID"<br>■ NOT SET | |
| | PATTERN COLOR | □ BLACK<br>□ CYAN<br>□ MAGENTA<br>■ NOT SET | |
| | CONTROL CODE | □ 1<br>□ 2<br>□ 3<br>■ NOT SET | 1 = COPY, TRANSMIT, STORE<br>2 = TRANSMIT, STORE<br>3 = TRANSMIT |

FIG. 21

| PATTERN ON/OFF | SETTING ITEM | VALUE | OTHER |
|---|---|---|---|
| ☐ON<br>☐OFF<br>■REQUIRED | CONTROL PATTERN | ☐SET<br>■NOT SET | CONTROL CODE<br>PATTERN COLOR<br>REQUIRED |
| | DETERRENT PATTERN | ■SET<br>☐NOT SET | DETERRENT CHARACTERS<br>PATTERN COLOR<br>REQUIRED |
| | DETERRENT CHARACTERS | ☐"COPY"<br>☐"Confidential"<br>■"VOID"<br>☐NOT SET | |
| | PATTERN COLOR | ☐BLACK<br>■CYAN<br>☐MAGENTA<br>☐NOT SET | |
| | CONTROL CODE | ☐1<br>☐2<br>☐3<br>■NOT SET | 1 = COPY, TRANSMIT, STORE<br>2 = TRANSMIT, STORE<br>3 = TRANSMIT |

(a) DETERRENT PATTERN (b) CONTROL PATTERN

FIG. 24

(a)
- SETTING ITEM ; 1    * * * * *
- SETTING ITEM ; 2    "NOT SET"
- SETTING ITEM ; 3    * * * *
- SETTING ITEM ; 4    "NOT SET"
- SETTING ITEM ; 5    * * * *
- SETTING ITEM ; 6    * * * * * *
- SETTING ITEM ; 7    * * * *
- SETTING ITEM ; 8    "NOT SET"
- SETTING ITEM ; 9    * * * * * *
- SETTING ITEM ; 10   * * * *

(b)
- SETTING ITEM ; 2    * * * * *
- SETTING ITEM ; 4    * * * * *
- SETTING ITEM ; 8    * * * * *

FIG. 25

(a)
- SETTING ITEM ; 1    * * * *
- SETTING ITEM ; 2    * * * * *
- SETTING ITEM ; 3    * * * *
- SETTING ITEM ; 4    * * *
- SETTING ITEM ; 7    * * * * "NOT SET"
- SETTING ITEM ; 8    * * * *

(b)
- SETTING ITEM ; 5    * * * * * *
- SETTING ITEM ; 6    * * * * * *
- SETTING ITEM ; 8    * * * * * *
- SETTING ITEM ; 9    * * * * * *
- SETTING ITEM ; 10   * * * * * *

FIG. 26

(a)
- SETTING ITEM ; 1    aaaaa
- SETTING ITEM ; 2    "NOT SET"
- SETTING ITEM ; 3    b b b b
- SETTING ITEM ; 4    "NOT SET"
× SETTING ITEM ; 5    * * * * *
× SETTING ITEM ; 6    * * * * *
× SETTING ITEM ; 7    "NOT SET"
× SETTING ITEM ; 8    * * * * *
× SETTING ITEM ; 9    c c c c
× SETTING ITEM ; 10   * * * * *

(b)
- SETTING ITEM ; 1    * * * * *
- SETTING ITEM ; 2    AAAAAAA
- SETTING ITEM ; 3    * * * * *
- SETTING ITEM ; 4    BBBBBBB
- SETTING ITEM ; 5    * * * * *
- SETTING ITEM ; 6    * * * * *
- SETTING ITEM ; 7    * * * * *
- SETTING ITEM ; 8    CCCCCC
- SETTING ITEM ; 9    * * * * *
- SETTING ITEM ; 10   * * * * *

(c)
- SETTING ITEM ; 1    aaaaa
- SETTING ITEM ; 2    AAAAAAA
- SETTING ITEM ; 3    b b b b
- SETTING ITEM ; 4    BBBBBBB
× SETTING ITEM ; 5    * * * * *
× SETTING ITEM ; 6    * * * * *
× SETTING ITEM ; 7    * * * * *
× SETTING ITEM ; 8    CCCCCC
× SETTING ITEM ; 9    c c c c
× SETTING ITEM ; 10   * * * * *

APPARATUS, METHOD, AND SYSTEM OF CONTROLLING SETTING INFORMATION FOR CONFIDENTIAL DOCUMENT

CROSS-REFERENCE TO RELATED APPLICATIONS

This patent application is based on and claims priority under 35 U.S.C. §119 to Japanese Patent Application No. 2008-148871, filed on Jun. 6, 2008, in the Japanese Patent Office, the disclosure of which is hereby incorporated herein by reference.

FIELD OF THE INVENTION

The present invention generally relates to an apparatus, method, and system of generating a confidential document embedded with additional information, and more specifically to an apparatus, method, and system of controlling setting information to be used for generating a confidential document embedded with additional information.

BACKGROUND

In order to prevent the leakage of confidential information to the public, many companies prohibit the printing, transmission, or storage of data having the confidential information. In one example, there is the technology for generating a confidential document by adding a pattern to an original image, which is used to control the output of the confidential document. In another example, there is the technology for generating a confidential document by adding a pattern such as a deterrent pattern to an original image, which is to be made visible to the human eye when the confidential document is copied.

The above-described technology may be performed by a confidential document generating system. For most cases, the setting information, which determines how the pattern is added to the original image, may be set either by a user who instructs the confidential document generating system to generate a confidential document, or by an administrator who manages how the confidential document should be generated by the confidential document generating system. When there are more than one type of setting information available for determining how the pattern is added, the confidential document generating system needs to determine which one of the setting information to be used to avoid the conflict among the different types of setting information.

Japanese Patent Application Publication No. 2006-74093 describes an image forming apparatus, which selects one of the setting information set by the user and the setting information set by the administrator according to a predetermined rule. For example, in order to improve the confidentiality, the setting information set by the administrator may be used when the setting information set by the user does not provide the confidentiality level sufficiently high enough to satisfy the requirement set by the administrator.

SUMMARY

While the technology described in the Japanese Patent Application Publication No. 2006-74093 may sufficiently improve the confidentiality of the confidential document, the user who instructs the generation of the confidential document may sometimes want to determine how the pattern should be added according to the user preference as long as the confidentiality of the confidential document can satisfy the requirement set by the administrator.

Further, even when the administrator setting information is used in replace of the user setting information for the security reasons, the user may want to know what patterns are added to the image data as the user cannot visually recognize the pattern added to the image data, or the user may want to at least be notified that the user setting information does not satisfy the requirement set by the administrator.

In view of the above, example embodiments of the present invention include an apparatus, method, system, computer program and product each capable of generating ;a confidential document by adding additional pattern to image data.

In one example, an information processing apparatus includes: an administrator setting information obtain section to obtain administrator setting information from an image forming apparatus; a user preference obtain section to obtain user preference information, which will be used to modify the administrator setting information and having the contents determined based on the administrator setting information; and a display control section to control the display of the administrator setting information that is modified with the user preference information as user setting information.

In another example, the information processing apparatus further includes: an input section to input the user preference information having the contents determined based on the administrator setting information; and a storage device to store the user preference information.

In another example, the administrator setting information includes information indicating whether the administrator setting information is allowed for user modification by the administrator. The input section inputs the user preference information based on the information indicating whether the administrator setting information is allowed for user modification by the administrator.

In another example, the information processing apparatus further includes an image data generating section to generate image data that reflects the user setting information. The display control section controls the display of the image data in addition to the control of the display of the user setting information.

In another example, an image forming apparatus includes: a storage section to store administrator setting information; a transmit section to send the administrator setting information to an information processing apparatus; a receive section to receive a user instruction for generating the confidential document according to user setting information from the information processing apparatus; and an output section to output the confidential document being added with the additional information according to the user instruction. The user instruction may include information regarding the user setting information that is allowed for user modification, or not allowed for user modification.

In another example, the administrator setting information to be sent from the image forming apparatus may include information indicating whether the administrator setting information is allowed for user modification by the user.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an illustration for explaining administrator setting information and user setting information, managed by the confidential document generating system of FIG. 1, according to an example embodiment of the present invention;

FIG. 11 is an illustration for explaining administrator setting information and user setting information, managed by the confidential document generating system of FIG. 1, according to an example embodiment of the present invention;

FIG. 18 is an illustration for explaining administrator setting information, managed by the confidential document generating system of FIG. 1, according to an example embodiment of the present invention;

FIG. 21 is an illustration for explaining user setting information, managed by the confidential document generating system of FIG. 1, according to an example embodiment of the present invention;

FIG. 24 is an illustration for explaining generating user setting information from administrator setting information and user preference information;

FIG. 25 is an illustration for explaining generating user setting information from administrator setting information and user preference information; and FIG. 26 is an illustration for explaining generating user setting information from administrator setting information and user preference information.

Figure 1:
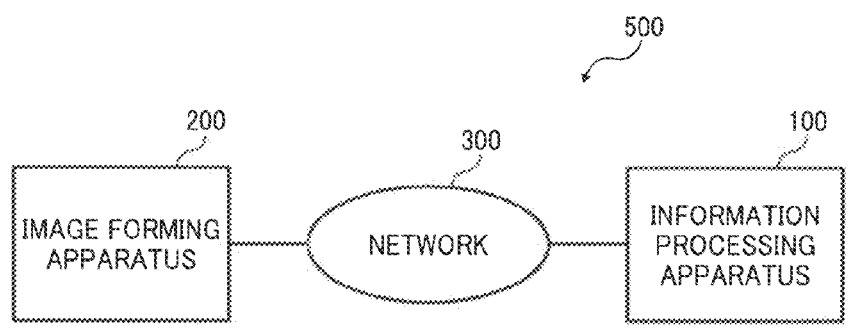
FIG. 1 is a schematic block diagram illustrating a configuration of a confidential document generating system including an information processing apparatus and an image forming apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
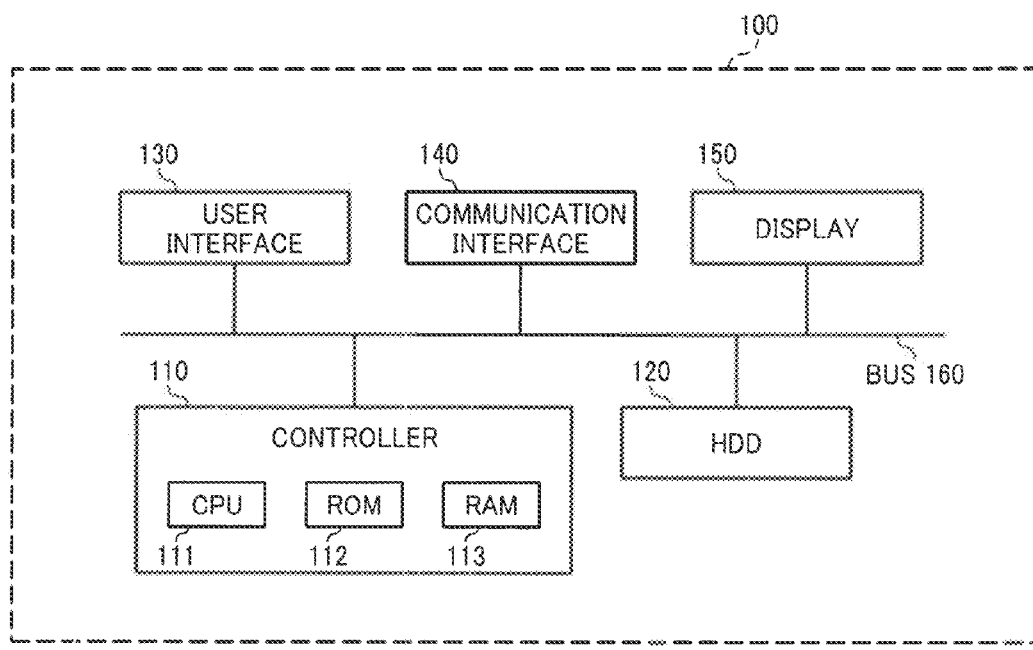
FIG. 2 is a hardware structure of the information processing apparatus of FIG. 1, according to an example embodiment of the present invention.
Figure 3:
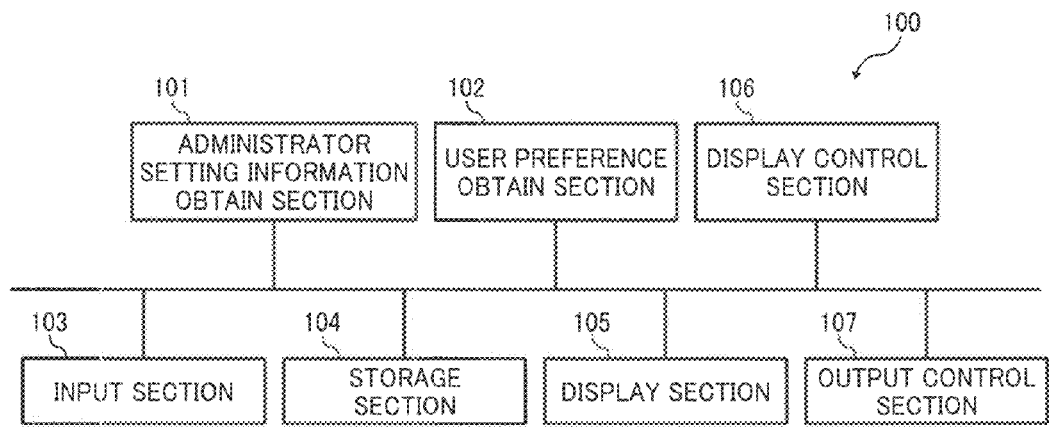
FIG. 3 is a functional structure of the information processing apparatus of FIG. 1, according to an example embodiment of the present invention.
Figure 4:
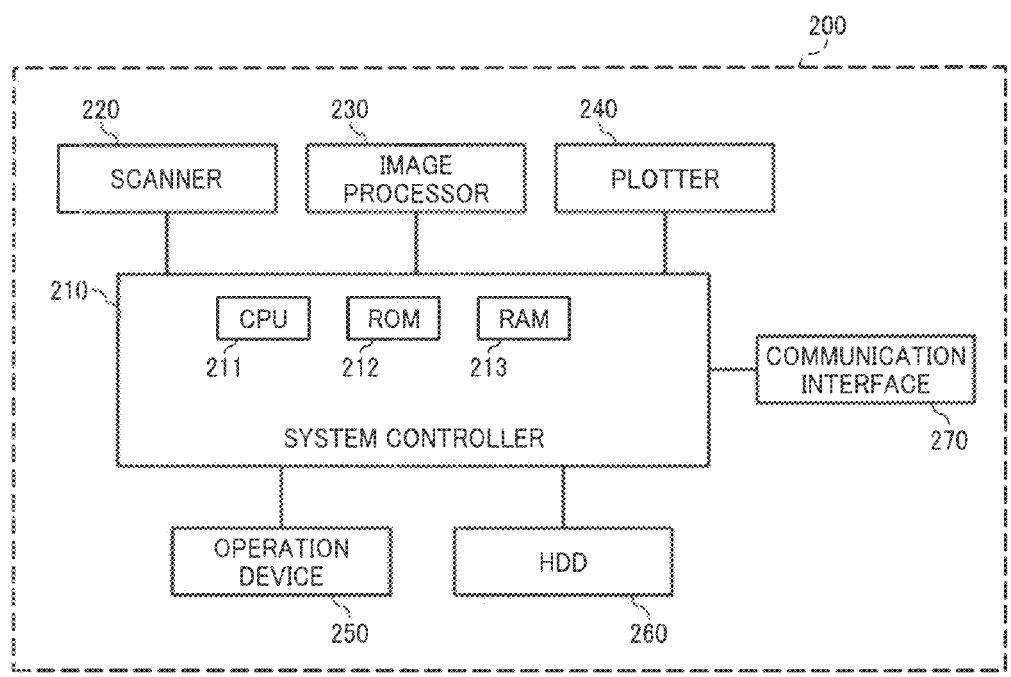
FIG. 4 is a hardware structure of the image forming apparatus of FIG. 1, according to an example embodiment of the present invention.
Figure 5:
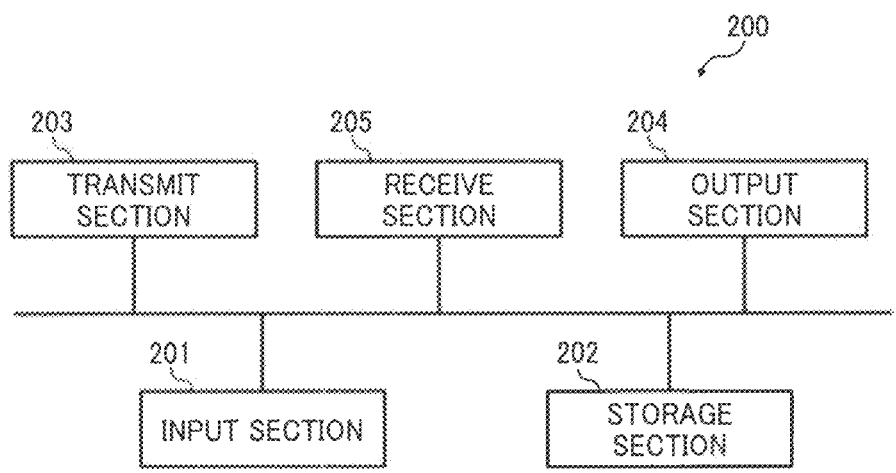
FIG. 5 is a functional structure of the image forming apparatus of FIG. 1, according to an example embodiment of the present invention.

Referring now to FIGS. 1 to 5, a confidential document generating system 500 is explained according to an example embodiment of the present invention. FIG. 1 illustrates a configuration of the confidential document generating system 500 including an information processing apparatus 100 and an image forming apparatus 200, which are connected via a network 300. FIGS. 2 and 3 each illustrate a structure of the information processing apparatus 100. FIGS. 4 and 5 each illustrate a structure of the image forming apparatus 200.

<Confidential Document Generating System 500>

The confidential document generating system 500 is capable of generating a confidential document according to setting information, which may be set either by a user or an administrator. For the illustrative purpose, this example assumes that the user operates the information processing apparatus 100.

In one example, the information processing apparatus 100 sends a user instruction to the image forming apparatus 200 through the network 300, which instructs the image forming apparatus 200 to generate a confidential document by embedding additional information onto image data in the form of a plurality of patterns, for example, when the image data is to be output as a printed document. The image data may be generated and stored by the information processing apparatus 100. Alternatively, the image data may be previously stored in the image forming apparatus 200 or any storage device on the network 300. When the user instruction for generating a confidential document is received, the image forming apparatus 200 outputs the image data embedded with the additional information in the form of the plurality of patterns as a printed document.

In one example, the additional information being embedded as the plurality of patterns may correspond to output control information, which specifies the usage of the confidential document. For example, the output control information may restrict printing, transmission, or storage of the confidential document. For the illustrative purpose, the plurality of patterns representing the output control information may be referred to as the control pattern. In another example, the additional information being embedded as the plurality of patterns may correspond to deterrent information such as copy deterrent characters to be made visible when the confidential document is copied. For the illustrative purpose, the plurality of patterns representing the deterrent information may be referred to as the deterrent pattern.

The image processing apparatus 100 may be implemented by any number of devices or apparatuses. Further, the image processing apparatus 100 may be implemented by any desired type of device or apparatus as long as it is capable of transmitting or receiving data including, for example, a personal computer (PC), multifunctional apparatus (MFP), portable or mobile phone, personal digital assistant (PDA) device, digital camera, etc.

The image forming apparatus 200 is capable of forming an image of image data onto a recording sheet and outputting the recording sheet. The image forming apparatus 200 may be implemented by any desired apparatus capable of forming an image using any desired image forming method such as the ink jet printing method or the electrophotographic printing method. For example, the image forming apparatus 200 may be implemented as a copier, a printer, a facsimile, or a multifunctional apparatus capable of having a plurality of functions of printing, faxing, scanning, copying, etc.

The network 300 may be implemented by any desired network of wired or wireless including, for example, the local area network, the intranet, the Internet, etc.

In example operation, the user may input setting information indicating the user preference of how the confidential document is to be generated using the image data though the information processing apparatus 100, for example, when the user instructs the image forming apparatus 200 to generate the confidential document. Further, in this example, the image forming apparatus 200 may be previously provided with setting information indicating the requirement of how the confidential document should be generated, which is previously set by the administrator of the confidential document generating system 500. For the illustrative purpose, the setting information set by the user, for example, for each image forming job, may be referred to as the user setting information. The setting information set by the administrator, for example, for the purpose of preventing the leakage of confidential information may be referred to as the administrator setting information. Any one or any portion of the user setting information and the administrator setting information may be used to determine how the confidential document should be generated, for example, how the plurality of patterns is embedded onto the image data to be output as the confidential document.

<Information Processing Apparatus 100: Hardware Structure>

Referring now to FIG. 2, a hardware structure of the information processing apparatus 100 is explained according to an example embodiment of the present invention. The information processing apparatus 100 includes a controller 110, a hard disk drive (HDD) 120, a user interface 130, a communication interface 140, and a display 150, each of which are connected through a system bus 160.

The controller 110 includes a central processing unit (CPU) 111, a read only memory (ROM) 112, and a random access memory (RAM) 113.

The CPU 111, which may be implemented by any processor, controls operation of the information processing apparatus 100. The ROM 112, which may be implemented by any desired nonvolatile memory, stores various data or programs. The RAM 113, which may be implemented by any desired volatile memory, may function as a work area of the CPU 111. For example, the CPU 111 reads out a program stored in the ROM 112 or the HDD 120 onto the RAM 113 to deploy the instructions onto the RAM 113. The CPU 111 may deploy the image data, which may be obtained from the communication interface 140, onto the RAM 113 for further processing. Alternatively, the image data may be internally generated by the information processing apparatus 100, for example, using any desired application program available for use.

The HDD 120 may be used to store various data or programs. The user interface 130 receives data such as a user instruction input by the user, and sends it to another device such as the controller 110. The user interface 130 may be implemented by an input device such as a keyboard, a mouse, etc. The communication interface 140 may allow each device of the apparatus 100 to communicate with another apparatus such as the image forming apparatus 200 through the network 300. The display 150 displays various data, which may be received via the controller 110, to the user. The display 150 may be implemented by a liquid crystal display (LCD), for example.

<Information Processing Apparatus 100: Functional Structure>

Referring to FIG. 3, a functional structure of the information processing apparatus 100 is explained according to an example embodiment of the present invention. More specifically, the information processing apparatus 100 may be provided with a printer driver application program, which may be stored in any memory available for use by the controller 110 of FIG. 2. The printer driver application program is provided with the function of allowing the user to input a user instruction for generating a confidential document with setting information that may be set by the user. When the printer driver application program, or at least the portion that relates to the function of generating the confidential document, is recalled by the user, the information processing apparatus 100 may be caused to have the functional structure illustrated in FIG. 3.

The information processing apparatus 100 includes an administrator setting information obtain section 101, a user preference obtain section 102, an input section 103, a storage section 104, a display section 105, a display control section 106, and an output control section 107.

The administrator setting information obtain section 101 obtains administrator setting information, which is previously registered in the image forming apparatus 200, from the image forming apparatus 200. For example, the functions of the administrator setting information obtain section 101 may be performed by the controller 110 and the communication interface 140.

The user preference obtain section 102 obtains user preference information indicating the user preference relating to generation of the confidential document. In this example, the user preference information may be received from the user as a user input only when it is allowed by the administrator. More specifically, in this example, the contents of the user preference information is determined based on the contents of the administrator setting information such that the user preference indicated by the user preference information does not conflict with the requirement indicated by the administrator setting information. The functions of the user preference obtain section 102 may be performed by the controller 110.

The input section 103 inputs a user instruction such as the user input indicating the user preference information. The functions of the input section 103 may be performed by the user interface 130 or the communication interface 140. For example, the user preference information may be input through the user interface 130 using the mouse or keyboard, or through the communication interface 140 from a communication device provided outside the apparatus 100. For the illustrative purpose, the user interface 130 and the communication interface 140 may be collectively referred to as the user interface.

The storage section 104 stores various data such as the user instruction received by the input section 102 including the user preference information input through the keyboard or mouse, the administrator setting information obtained from the image forming apparatus 200, etc. The functions of the storage section 104 may be performed by the ROM 112 or the HDD 140. The user preference obtain section 102 may obtain the user preference information, which is stored in the storage section 104.

The display section 105 displays various information to the user. For example, the display section 105 may display the contents of the administrator setting information or the user setting information to the user. The display section 105 may be performed by the display 150.

The display control section 106 controls the display of the setting information such as the administrator setting information or the user setting information. In one example, when the administrator setting information is obtained from the image forming apparatus 200, the display control section 106 may generate a screen based on the administrator setting information such that the user can easily recognize the contents of setting information that are allowed by the administrator for modification by the user. With this function, the user is prevented from setting the user setting information that will be in conflict with the requirement set by the administrator.

In another example, when the contents of the administrator setting information are modified according to the user preference indicated by the user preference information, the display control section 106 displays the modified contents of the administrator setting information that reflects the changes made by the user setting information as the user setting information to be used for generating the confidential document. With this function, the user can easily recognize how the confidential document will be generated, for example, how the plurality of patterns is to be embedded into the image data. Further, in this example, the display control section 106 may cause various information to be displayed on the display section 105 or any device connected to the apparatus 100. The functions of the display control section 106 may be performed by the controller 110 and/or the communication interface 140.

The output control section 107 sends a user instruction for generating the confidential document according to the user setting information being displayed by the display control section 106, to the image forming apparatus 200. The output control section 107 may be implemented by the controller 110 and/or the communication interface 140.

<Image Forming Apparatus 200: Hardware Structure>

Referring now to FIG. 4, a hardware structure of the image forming apparatus 200 is explained according to an example embodiment of the present invention. The image forming apparatus 200 includes a system controller 210, a scanner 220, an image processor 230, a plotter 240, an operation device 250, a hard disk drive (HDD) 260, and a communication interface 270.

The system controller 210 controls operation of the image forming apparatus 200, and includes a CPU 211, ROM 212, and RAM 213. For example, the CPU 211 may read a program from the ROM 212 or the HDD 260 onto the RAM 212 to perform operation according to the instructions being deployed. Further, the CPU 211 may deploy the image data input from the communication interface 270 onto the RAM 213 for further processing. Alternatively, the image data may be obtained from any device within the apparatus 200.

The scanner 220 scans an original document into image data for further processing. The image processor 230 may perform various image processing to the image data, such as generation of the plurality of patterns based on the setting information or addition of the plurality of patterns onto the image data. The plotter 240 forms an image of the image data onto a recording sheet. The operation device 250 includes an output device for displaying various information sent by the system controller 210 to the user, and/or an input device for allowing the user to input the user instruction and sending the user instruction to the system controller 210. For example, the operation device 250 may be implemented as a display with a touch panel screen having the functions of inputting and outputting. The HDD 260 stores various data and programs. The communication interface 270 allows each device of the apparatus 200 to communicate with the other apparatus such as the information processing apparatus 100 through the network 300.

<Image Forming Apparatus 200: Functional Structure>

Referring now of FIG. 5, a functional structure of the image forming apparatus 200 is explained according to an example embodiment of the present invention. Specifically, in this example, the image forming apparatus 200 is provided with a confidential document generating program having the function of generating the confidential document, for example, according to the user instruction received from the information processing apparatus 100. For example, when the image forming apparatus 200 is called for such function by the information processing apparatus 100, or when the power of the image forming apparatus 200 is turned on, the confidential document generating program may be executed to cause the image forming apparatus 200 to have the functional structure illustrated in FIG. 5.

The image forming apparatus 200 includes an input section 201, a storage section 202, a transmit section 203, a receive section 204, and an output section 205.

The input section 201 inputs the administrator setting information received from the administrator. The functions of the input section 201 may be performed by any one of the system controller 210, the operation device 250, and the communication interface 270 of FIG. 4. For example, the input section 201 may input the administrator setting information obtained through the operation device 250. Alternatively, the input section 201 may input the administrator setting information obtained through the communication interface 270 from any device provided outside the apparatus 200.

The storage section 202 stores the administrator setting information obtained by the input section 201. The functions of the storage section 202 may be performed by the ROM 12 or the HDD 260 of FIG. 4.

The transmit section 203 sends the administrator setting information, which is stored in the storage section 202, to the information processing apparatus 100. The functions of the transmit section 203 may be performed by the system controller 210 and the communication interface 270 of FIG. 4.

The receive section 204 receives the user instruction for generating the confidential document from the information processing apparatus 100. The functions of the receive section 204 may be performed by the system controller 210, and the communication interface 270.

The output section 205 outputs the image data according to the user instruction received by the receive section 204 such that the output image is embedded with the plurality of patterns as instructed by the user instruction received by the receive section 204. The functions of the output section 205 may be performed by the system controller 210, the image processor 230, the plotter 240, and the communication interface 270. For example, the image processor 230 may process the image data according to the user setting information that may be generated by modifying the administrator setting information using the user preference information. The plotter 240 forms an image of the image data processed by the image processor 230 onto a recording sheet. Alternatively, the processed image data may be output to the communication interface 270 for distribution to another apparatus through the network 300, such as the information processing apparatus 100. Alternatively, the processed image data may be output to the communication interface 270 for distribution to another apparatus in the form of facsimile data. Alternatively, the processed image data may be stored in any storage device within or outside the apparatus 200.

<Administrator Setting Information and User Setting Information>

Referring now to FIG. 6, the administrator setting information and the user setting information are each explained according to an example embodiment of the present invention.

In this example, the image forming apparatus 200 may store at least the administrator setting information in the storage section 202, for example, in the form of table illustrated in FIG. 6. The information processing apparatus 100 may store at least the user setting information in the storage section 104, for example, in the form of table illustrated in FIG. 6. Further, the administrator setting information and the user setting information may each include pattern on/off information ("PATTERN ON/OFF"), and setting item information ("SETTING ITEM").

The pattern ON/OFF information is used to determine whether the plurality of patterns is to be embedded into the image data to be output by the image forming apparatus 200. When the pattern ON/OFF information is "ON", the plurality of patterns should be embedded. When the pattern ON/OFF information is "OFF", the plurality of patterns is not required to be embedded.

The setting item information is used to determine how the plurality of patterns is embedded when the pattern ON/OFF information is "ON". More specifically, the setting item information may include a plurality of setting items each related to characteristics of the pattern to be added, and the value indicating whether a specific parameter value is set by the administrator for each of the plurality of setting items. The setting item information having the "SET" value indicates that the corresponding setting item has a specific parameter value being set by the administrator or the user. The setting item information having the "NOT SET" value indicates that the corresponding setting item does not have a specific parameter being set by the administrator or the user. When the setting item information has none of the "SET" and "NOT SET" values, the image forming apparatus 200 assumes that the setting item information does not have a specific parameter being set by the administrator or the user.

<Administrator Setting Information>

The contents of the administrator setting information differ depending on the specific requirement set by the administrator. In this example illustrated in FIG. 6, two cases of case A and case B are explained.

In the case A of FIG. 6, the pattern ON/OFF information is set to "OFF" when the administrator does not require the image forming apparatus 200 to embed the plurality of patterns onto the image data. Accordingly, the image forming apparatus 200 may automatically set the value of setting item information to be "NOT SET" for all setting items.

In the case B of FIG. 6, the pattern ON/OFF information is set to "ON" when the administrator requires the image forming apparatus 200 to embed the plurality of patterns onto the image data. Accordingly, the image forming apparatus 200 may request the administrator to input the value of the setting item information, for example, at the time of receiving the instruction for setting the pattern ON/OFF information to "ON" from the administrator. In response, the administrator may select whether the value should be "SET" or "NOT SET" for each item of the setting item information. In the case B of FIG. 6, the setting item that corresponds to the deterrent pattern has the "SET" value indicating that the specific parameter value has been set by the administrator for the deterrent pattern setting item.

<User Setting Information>

The contents of the user setting information differ depending on the specific requirement set by the administrator, which is obtainable from the administrator setting information. Referring to FIG. 6, the three cases of case C, case D, and case E are explained.

When the administrator does not require the image forming apparatus 200 to embed the plurality of patterns onto the image data, which is in the case A of FIG. 6, the user is allowed to select either the case C in which the pattern ON/OFF information for the user setting information is set to "OFF", or the case D in which the pattern ON/OFF information for the user setting information is set to "ON". When the administrator requires the image forming apparatus 200 to embed the plurality of patterns onto the image data, which is in the case B of FIG. 6, the user can only select the case E in which the pattern ON/OFF information for the user setting information is set to "ON". In the case E, the user is forced to select the pattern ON/OFF information to be "ON". In this example, the pattern ON/OFF information for the case E is defined to have the "REQUIRED" value as it is required by the administrator to add the plurality of patterns.

As in the case C of FIG. 6, when the pattern ON/OFF information is set to "OFF", the image forming apparatus 200 does not embed the plurality of patterns onto the image data such that it is not required to set any one of the setting items of the setting item information. Accordingly, the information processing apparatus 100 may automatically set the value of setting items information to be "NOT SET" for all setting items.

As in the case D of FIG. 6, when the pattern ON/OFF information is set to "ON", the image forming apparatus 200 embeds the plurality of patterns onto the image data. Accordingly, the information processing apparatus 100 requests the user to input the value of the setting item information, for example, at the time of receiving the instruction for setting the pattern ON/OFF information to "ON" from the user. In response, the user selects whether the value should be "SET" or "NOT SET" for each item of the setting item information. However, in this example, the user is requested to either select at least the setting item corresponding to the control pattern or the setting item corresponding to the deterrent pattern.

In the case D of FIG. 6, the setting items respectively corresponding to the deterrent pattern, the deterrent characters, and the pattern color have the "SET" values. In this example, when the user sets the deterrent pattern item to be "SET" for the user setting information, the user is requested to input the values respectively for the deterrent characters item and the pattern color item for the user setting information. In such case, all items of deterrent pattern, deterrent characters, and pattern color will be set to "SET".

In a similar manner, when the user sets the control pattern item to be "SET" for the user setting information, the user is requested to input the values respectively for the pattern color item and the control code item for the user setting information. In the case D of FIG. 6, since the control pattern item is set to "NOT SET", the pattern color item indicating the color of the control pattern and the control code item are set to "NOT SET".

Specifically, in this example illustrated in FIG. 6, the pattern color item may be commonly used for both cases of control pattern and deterrent pattern. Alternatively, the pattern color item may be provided for each case of control pattern and deterrent pattern separately.

As in the case E of FIG. 6, when the pattern ON/OFF information for the user setting information is forced to set to "ON" or "REQUIRED", the image forming apparatus 200 embeds the plurality of patterns onto the image data according to the administrator setting information. Since the requirement set by the administrator setting information should be satisfied, the setting item information of the user setting information for the case E is caused to reflect the setting item information of the administrator setting information for the case B. More specifically, as illustrated in FIG. 6, since the deterrent pattern item has the value "SET" for the case B, the deterrent pattern item is caused to have the value "SET" for the case E.

Further, for the setting item of the setting items information of the administrator setting information having the "SET" value, the user is not allowed to change the value of the setting item, for example, using the information processing apparatus 100. Accordingly, in the case E of FIG. 6, the deterrent pattern item for the user setting information, which is forced to set to "SET", may be provided with information indicating that the user it not allowed to change the setting for the deterrent pattern setting item ("NOT ALLOWED" in FIG. 6). For the setting item of the setting items information of the administrator setting information having the "NOT SET" value, the user is allowed to change the value of the setting item, for example, using the information processing apparatus 100. In such case, the setting item may be provided with information indicating that the user is allowed to change the setting for the setting item ("ALLOWED" in FIG. 6). Accordingly, in the case E of FIG. 6, all items other than the deterrent pattern item may be set to have the value as instructed by the user.

Specifically, in the case B of FIG. 6, the deterrent pattern item has the "SET" value, while the deterrent characters item and the pattern color item each have the "NOT SET" value. Accordingly, in the case E of FIG. 6, the user is forced to embed the deterrent pattern as the "SET" value of the deterrent pattern item cannot be changed. When the deterrent pattern item has the "SET" value, the user is requested to set the values for the deterrent characters item and the pattern color item along with the selection of the deterrent pattern item. In such case, the user is forced to embed the deterrent pattern, but allowed to set how the deterrent pattern is to be added. Accordingly, the values for the deterrent pattern item, the deterrent characters item, and the pattern color item are all set to "SET".

Alternatively, in the case B, the administrator may set the values for the deterrent characters item and the pattern color item for the administrator setting information along with the selection of the deterrent pattern item. In such case, the user setting information should reflect the values for all of the deterrent pattern item, the deterrent characters item, and the pattern color item indicated by the administrator setting information. Accordingly, the user is not allowed to change how the deterrent pattern is added.

<Operation Performed by Information Processing Apparatus 100>

Figure 7:
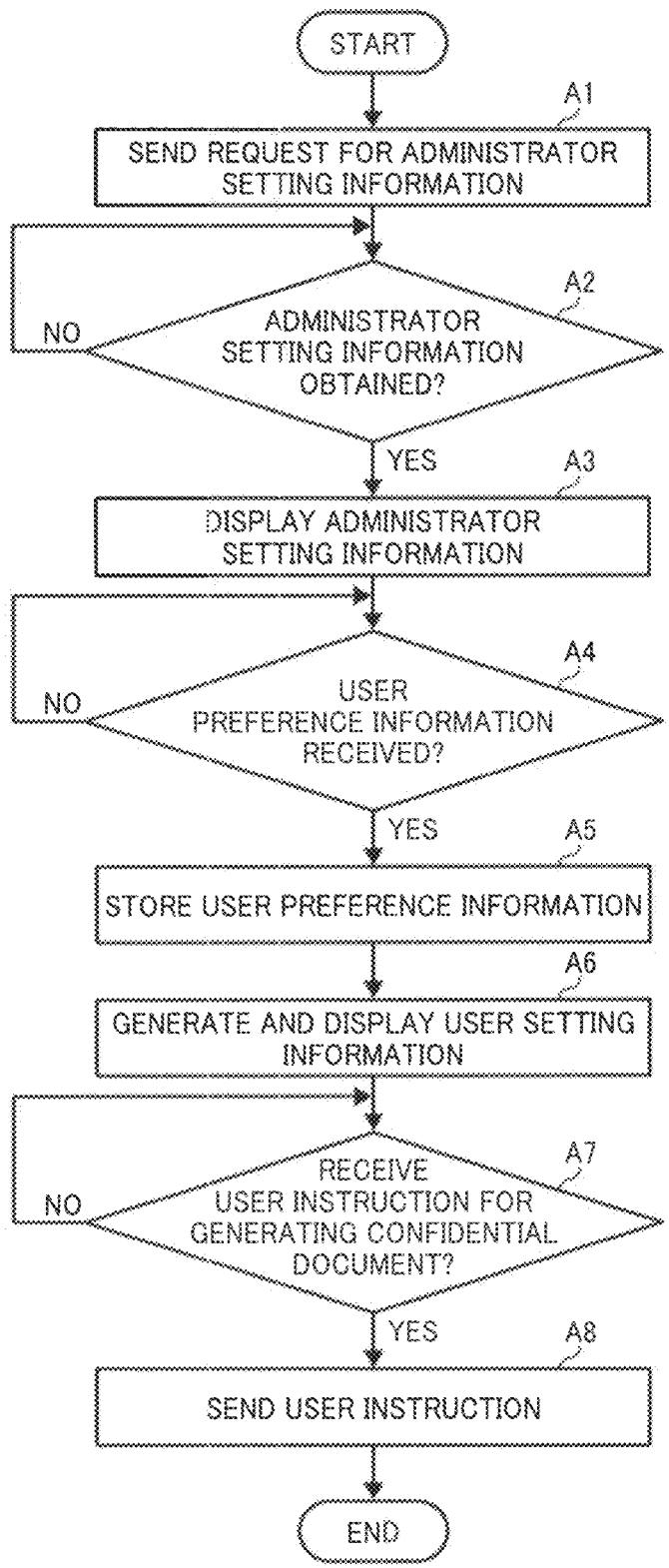
FIG. 7 is a flowchart illustrating operation of generating and sending a user instruction for generating a confidential document, performed by the information processing apparatus of FIG. 1, according to an example embodiment of the present invention.

Referring now to FIG. 7, operation of generating and sending a user instruction for generating a confidential document to the image forming apparatus 200, performed by the information processing apparatus 100 is explained according to an example embodiment of the present invention.

At A1, the administrator setting information obtain section 101 of the information processing apparatus 100 sends a request to the image forming apparatus 200 through the network 300, which requests for the administrator setting information.

At A2, the administrator setting information obtain section 101 determines whether the administrator setting information is obtained from the image forming apparatus 200. When it is determined that the administrator setting information is obtained ("YES" at A2), the operation proceeds to A3. Further, the administrator setting information is stored in the storage section 104 of the information processing apparatus 100, for example, in the form of table illustrated in FIG. 6. When it is determined that the administrator setting information is not obtained ("NO" at A2), the operation repeats A2.

At A3, the display section 105 displays the administrator setting information to inform the user the contents of the administrator setting information. In this example, the display control section 106 may generate a screen based on the administrator setting information to allow the user to easily recognize which one of the setting items is modifiable. Further, the screen is generated so as to prevent the user from modifying the setting items that are not allowed by the administrator. In this manner, the user is only allowed to set the user setting information, which is not in conflict with the administrator setting information.

At A4, the input section 103 determines whether a user input indicating the user preference information is received from the user. When it is determined that the user preference information is received ("YES" at S4), the operation proceeds to A5. When it is determined that the user preference information is not received ("NO" at S4), the operation repeats A4.

At A5, the storage section 104 stores the user preference information received from the input section 103 at least temporarily.

At S6, the user preference obtain section 102 may modify the administrator setting information using the user preference information to generate user setting information that is used for generating the confidential document. For example, as illustrated in FIG. 6, the user preference obtain section 102 modifies the administrator setting information of FIG. 6 stored in the storage section 104 using the user preference information stored in the storage section 104 to generate the user setting information of FIG. 6. The user setting information may be stored in the storage section 104 as the setting information individually set by the user for each job to be performed.

Further, at A6, the display control section 106 generates a screen based on the user setting information stored in the storage section 104, and displays the screen including the user setting information to the user through the display section 105. In this manner, the user at the information processing apparatus 100 can recognize the setting information to be used when the image data is to be output as the confidential document.

At A7, the input section 103 determines whether a user instruction for generating the confidential document according to the user setting information displayed at A6 is received. When it is determined that the user instruction for generating is received ("YES" at A7), the operation proceeds to A8. When it is determined that the user instruction for generating is not received ("NO" at A7), the operation repeats A7.

At A8, the output control section 107 outputs the user instruction for generating the confidential document using the image data according to the user setting information to the image forming apparatus 200, and the operation ends. As described above, the user setting information reflects the modified administrator setting information that is modified using the user preference information input by the user. For example, the output control section 107 may send a printing job including the image data to be output and control data that reflects the user setting information, to the image forming apparatus 200.

<Operation Performed by Image Forming Apparatus 200>

Figure 8:
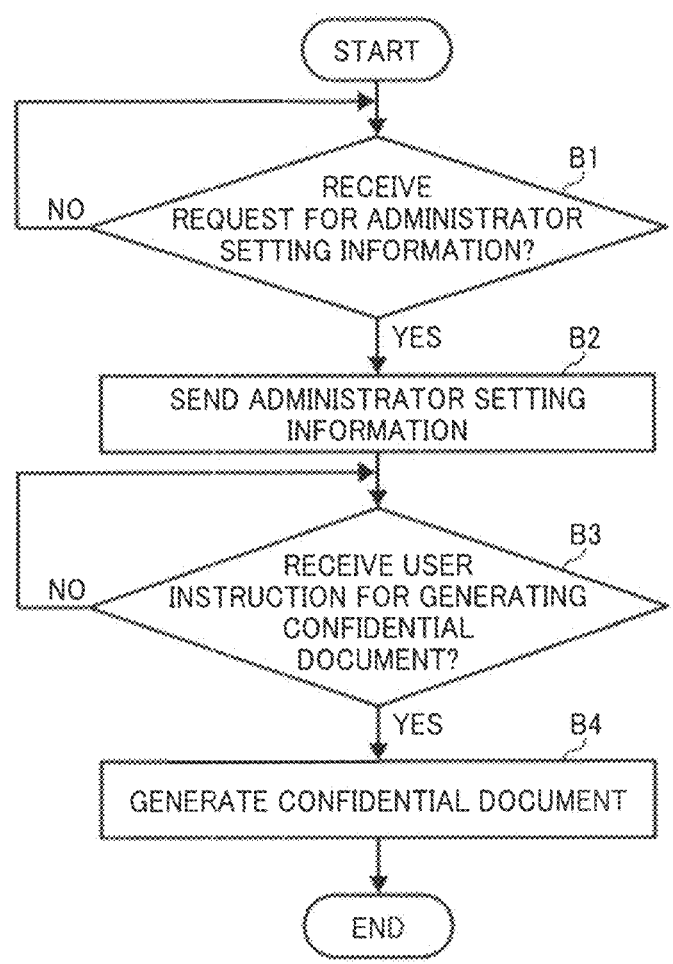
FIG. 8 is a flowchart illustrating operation of generating a confidential document from the image data, performed by the image forming apparatus of FIG. 1, according to an example embodiment of the present invention.

Referring now to FIG. 8, operation of generating the confidential document, performed by the image forming apparatus 200, is explained according to an example embodiment of the present invention.

At B1, the receive section 204 of the image forming apparatus 200 determines whether a request for the administrator setting information is received from the information processing apparatus 100. When it is determined that the request is received ("YES" at B1), the operation proceeds to B2. When it is determined that the request is not received ("NO" at B1), the operation repeats B1.

At B2, the transmit section 203 reads out the administrator setting information stored in the storage section 202, and sends the administrator setting information to the information processing apparatus 100.

By sending the administrator setting information to the information processing apparatus 100, the user at the information processing apparatus 100 can recognize which one of the settings items is allowed for user modification. For example, as illustrated in the case B of FIG. 6, when the pattern ON/OFF information of the administrator setting information is "ON", the administrator setting information may further include the setting item information indicating which one of the setting items has the value set by the administrator. Specifically, in the case B of FIG. 6, the setting item information for the administrator setting information indicates that the deterrent pattern setting item has the value "SET", and all other setting items have the values "NOT SET". When the administrator setting information of the case B is sent to the information processing apparatus 100, the information processing apparatus 100 displays the administrator setting information in a manner that the user can recognize which one of the setting items is allowed for modification by the user. In this manner, as described above referring to FIG. 7, the user may input the user preference information only when such modification is allowed.

Referring back to FIG. 8, at B3, the receive section 204 determines whether the user instruction for generating the confidential document according to the user setting information is received from the information processing apparatus 100. When it is determined that the user instruction for generating is received ("YES" at B3), the operation proceeds to B4. When it is determined that the user instruction for generating is not received ("NO" at B3), the operation repeats B3.

At B4, the output section 205 forms an image of the image data onto the recording sheet after adding the plurality of patterns according to the user setting information received from the information processing apparatus 100 at B3, and the operation ends.

<Operation Performed by Confidential Document Generating System 500>

Figure 9:
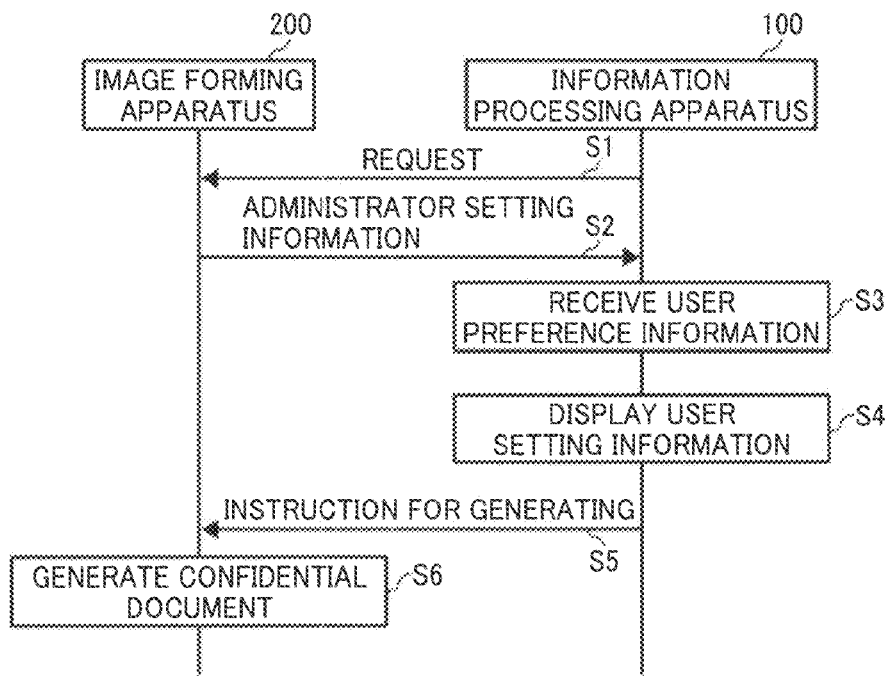
FIG. 9 is a data sequence diagram illustrating operation of generating a confidential document, performed by the confidential document generating system of FIG. 1, is explained according to an example embodiment of the present invention.

Referring now to FIG. 9, operation of outputting the image data, performed by the confidential document generating system 500, is explained according to an example embodiment of the present invention.

At S1, the administrator setting information obtain section 101 of the information processing apparatus 100 sends a request to the image forming apparatus 200 for the administrator setting information through the network 300. The receive section 204 of the image forming apparatus 200 receives the request from the information processing apparatus 100.

At S2, when the receive section 204 receives the request, the transmit section 203 of the image forming apparatus 200 obtains the administrator setting information stored in the storage section 202, and sends the administrator setting information to the information processing apparatus 100 through the network 300.

The administrator setting information obtains section 101 receives the administrator setting information, and stores the administrator setting information in the storage section 104.

At S3, the display section 105 displays a screen generated based on the administrator setting information to the user. The input section 103 receives the user preference information from the user, and stores the user preference information in the storage section 104.

At S4, the user preference obtain section 102 modifies the administrator setting information stored in the storage section 104 with the user preference information stored in the storage section 104 to generate the user setting information to be used for generating the confidential document. Further, the display control section 106 generates a screen based on the user setting information, and displays the screen through the display section 105. In this manner, the user can easily recognize the setting information to be used for the confidential document.

At S5, the information processing apparatus 100 sends a user instruction for generating the confidential document to the image forming apparatus 200. More specifically, when the user instruction for generating is received through the input section 103, the output control section 107 generates a print job including the image data to be output and the control data that reflects the user setting information, and sends the print job to the image forming apparatus 200 through the network 300.

The image forming apparatus 200 receives the user instruction for generating, such as the print job, via the receive section 204. At S6, the output section 205 forms an image of the image data according to the user setting information received from the information processing apparatus 100. For example, when the plurality of patterns is to be embedded, the output section 205 generates the plurality of patterns according to the user setting information, and embeds the plurality of patterns to the image data.

In the above-described example, the information processing apparatus 100 generates the user setting information, which is the administrator setting information that is modified with the user preference information, and sends the user setting information to the image forming apparatus 200.

Alternatively, the information processing apparatus 100 may obtain the user preference information from the user, and sends the user preference information without generating the user setting information that reflects the modified administrator setting information to the image forming apparatus 200. In such case, the image forming apparatus 200 modifies the administrator setting information using the user preference information received from the information processing apparatus 100 to generate the user setting information. According to the user setting information, the image forming apparatus 200 generates the plurality of patterns, and embeds the plurality of patterns to the image data.

Alternatively, the information processing apparatus 100 may additionally generate the plurality of patterns according to the user setting information after generating the user setting information, and embed the plurality of patterns to the image data to generate the confidential document in the electronic form. The information processing apparatus 100 then sends the confidential document to the image forming apparatus 200. The image forming apparatus 200 forms an image of the confidential document onto a recording sheet.

<Operation of FIG. 9 in the Case of Setting Information Illustrated in FIG. 6>

Referring now to FIGS. 6 and 9, operation of generating the user setting information to be used for the confidential document is explained according to an example embodiment of the present invention.

<Case A and Case C of FIG. 6>

When the pattern ON/OFF information of the administrator setting information is set to "OFF" as in the case A, and when the pattern ON/OFF information of the user setting information is set to "OFF" as in the case C, the image forming apparatus 200 does not embed the plurality of patterns according to the user setting information.

When the administrator setting information has the case A and the user setting information has the case C, referring to FIG. 9, at S1, the administrator setting information obtain section 101 requests the image forming apparatus 200 for the administrator setting information. In response, at S2, the administrator setting information obtain section 101 receives the administrator setting information including the pattern ON/OFF information having the "OFF" value and the setting item information having the "NOT SET" values.

At S3, the display control section 106 generates a screen based on the administrator setting information including the pattern ON/OFF information having the "OFF" value and the setting item information having the "NOT SET" values, and displays the screen through the display section 105 to the user. With this information, the user at the information processing apparatus 100 can easily recognize that the administrator does not require the image forming apparatus 200 to embed the plurality of patterns onto the image data.

At S3, the user may input the user instruction including the user preference information. In this example, it is assumed that the user inputs the user preference information, which selects not to embed the plurality of patterns, for example, by selecting the value of the pattern ON/OFF information to be "OFF". When the input section 103 detects that the pattern ON/OFF information is set to "OFF", the information processing apparatus 100 does not require the user to input further information. In such case, the input section 103 stores the pattern ON/OFF information having the "OFF" value as the user preference information in the storage section 104.

At S4, the user preference obtain section 102 of the information processing apparatus 100 obtains the user preference information stored in the storage device 104, and modifies the administrator setting information using the user preference information to generate user setting information. The display control section 106 generates a screen based on the user setting information, and displays the screen to the user through the display section 105. In this manner, the user can easily recognize the setting information to be used for generating the confidential document even when the administrator setting information and the user setting information each have different contents.

More specifically, in this example, the administrator setting information received by the administrator setting information obtain section 101 has the contents illustrated as the case A of FIG. 6. The user setting information obtained by the user preference obtain section 102 has the contents illustrated as the case C of FIG. 6.

At S5, when the user instruction for generating the confidential document according to the user setting information being displayed is received, the output control section 107 sends an instruction for generating the confidential document to the image forming apparatus 200.

At S6, when the receive section 204 receives the user instruction for generating, the output section 205 of the image forming apparatus 200 generates the document while not adding the plurality of patterns according to the user setting information, and the operation ends. In this example, the plurality of patterns is not added as instructed by the user through the user setting information, which does not conflict the requirement set by the administrator.

<Case A and Case D of FIG. 6>

When the pattern ON/OFF information of the administrator setting information is set to "OFF" as in the case A, and when the pattern ON/OFF information of the user setting information is set to "ON" as in the case D, the image forming apparatus 200 embeds the plurality of patterns according to the user setting information.

Referring to FIG. 9, at S1, the administrator setting information obtain section 101 requests the image forming apparatus 200 for the administrator setting information. In response, at S2, the administrator setting information obtain section 101 receives the administrator setting information including the pattern ON/OFF information having the "OFF" value and the setting item information having the "NOT SET" values.

At S3, the display control section 106 generates a screen based on the administrator setting information including the pattern ON/OFF information having the "OFF" value and the setting item information having the "NOT SET" values, and displays the screen through the display section 105 to the user.

At S3, the user may input the user instruction including the user preference information. In this example, it is assumed that the user inputs the user preference information, which selects to embed the plurality of patterns, for example, by selecting the value of the pattern ON/OFF information to be "ON", and the values of the setting items of the setting item information. When the input section 103 detects that the pattern ON/OFF information is set to "ON", the input section 103 stores the pattern ON/OFF information having the "ON" value and the setting item information having the set values as the user preference information in the storage section 104.

At S4, the user preference obtain section 102 of the information processing apparatus 100 obtains the user preference information stored in the storage device 104 as indicated by the case D of FIG. 6, and modifies the administrator setting information using the user preference information to generate user setting information. The display control section 106 generates a screen based on the user setting information, and displays the screen to the user through the display section 105. In this manner, the user can easily recognize the setting information to be used for generating the confidential document even when the administrator setting information and the user setting information each have different contents.

More specifically, in this example, the administrator setting information received by the administrator setting information obtain section 101 has the contents illustrated as the case A of FIG. 6. The user setting information obtained by the user preference obtain section 102 has the contents illustrated as the case D of FIG. 6.

At S5, when the user instruction for generating the confidential document according to the user setting information being displayed is received, the output control section 107 sends an instruction for generating the confidential document to the image forming apparatus 200.

At S6, when the receive section 204 receives the user instruction for generating, the output section 205 of the image forming apparatus 200 generates the confidential document by adding the plurality of patterns according to the user setting information, and the operation ends. In this example, the plurality of patterns is added as instructed by the user through the user setting information, which does not conflict the requirement set by the administrator.

<Case B and Case E of FIG. 6>

When the pattern ON/OFF information of the administrator setting information is set to "ON" as in the case B, the pattern ON/OFF information of the user setting information is forced to set to "ON" or "REQUIRED" as in the case E. In such case, the image forming apparatus 200 embeds the plurality of patterns according to the user setting information as long as the user setting information satisfies the requirement set by the administrator setting information.

Referring to FIG. 9, at S1, the administrator setting information obtain section 101 requests the image forming apparatus 200 for the administrator setting information. In response, at S2, the administrator setting information obtain section 101 receives the administrator setting information including the pattern ON/OFF information having the "ON" value and the setting item information having the "NOT SET" and "SET" values as indicated by the case B of FIG. 6.

At S3, the display control section 106 generates a screen based on the administrator setting information including the pattern ON/OFF information having the "ON" value and the setting item information having the "NOT SET" and "SET" values, and displays the screen through the display section 105 to the user. With this function, the user at the information processing apparatus 100 can easily recognize that the administrator requires the image forming apparatus 200 to embed the plurality of patterns onto the image data, specifically, by adding the deterrent pattern.

At S3, the user may input the user instruction including the user preference information as long as it is allowed by the administrator setting information. Since the administrator setting information indicates that the deterrent pattern item has the "SET" value, the setting for the deterrent pattern item is not allowed to be changed as indicated by the information "NOT ALLOWED". For all other setting items of the control pattern, deterrent characters, pattern color, and control code, the user is allowed to set the values as the information "ALLOWED" indicates. The user may input the user preference information for those setting items that are allowed for modification. When the input section 103 detects that the user preference information is input, the input section 103 stores the user preference information in the storage section 104. In this example, the values of the setting items of deterrent characters and the pattern color are set by the user input.

At S4, the user preference obtain section 102 of the information processing apparatus 100 obtains the user preference information stored in the storage device 104 as indicated by the case E of FIG. 6, and modifies the administrator setting information using the user preference information to generate user setting information. The display control section 106 generates a screen based on the user setting information, and displays the screen to the user through the display section 105. In this manner, the user can easily recognize the setting information to be used for generating the confidential document even when the administrator setting information and the user setting information each have different contents.

More specifically, in this example, the administrator setting information received by the administrator setting information obtain section 101 has the contents illustrated as the case B of FIG. 6. The user setting information obtained by the user preference obtain section 102 has the contents illustrated as the case E of FIG. 6.

At S5, when the user instruction for generating the confidential document according to the user setting information being displayed is received, the output control section 107 sends an instruction for generating the confidential document to the image forming apparatus 200.

At S6, when the receive section 204 receives the user instruction for generating, the output section 205 of the image forming apparatus 200 generates the confidential document by adding the plurality of patterns according to the user setting information, and the operation ends. In this example, the plurality of patterns is added as instructed by the user through the user setting information, which does not conflict the requirement set by the administrator.

As described above referring to FIGS. 1 to 9, in the confidential document generating system 500, the information processing apparatus 100 requests the image forming apparatus 200 for the administrator setting information, and obtains the administrator setting information set by the administrator. The information processing apparatus 100 generates a screen based on the administrator setting information so as to notify the user which contents are allowed by the administrator for modification by the user. The information processing apparatus 100 obtains the user preference information, which is input by the user through the input section 103 and is not in conflict with the administrator setting information, and stores the user preference information in the storage section 104. The information processing apparatus 100 further reads the user preference information from the storage section 104, modifies the administrator setting information using the user preference information to generate the user setting information, and displays the user setting information on the display section 105. With this function, the user can easily recognize the setting information to be used for generating the confidential document even when the contents of the user setting information and the administrator setting information differ from each other.

Referring back to FIG. 6, when a specific setting item of the setting item information for the administrator setting information has the value previously set by the administrator, the information indicating that the specific setting item is not allowed for modification ("NOT ALLOWED") may be generated and attached for the specific setting item. The display control section 106 may generate a screen for display to the user based on this information indicating whether modification is allowed or not allowed such that the user is allowed to input the user preference information only for the setting item that is allowed for modification. With this function, the user setting information set by the user always satisfies the requirement indicated by the administrator setting information set by the administrator.

The operation of FIG. 9 may be performed in various other ways.

In the example illustrated in FIG. 9, the information processing apparatus 100 displays the user setting information to be used for generating the confidential document before receiving the user instruction for generating the confidential document, and sends the user instruction only when the user instruction for generating the confidential document is received. When the user instruction for generating is received from the information processing apparatus 100, the image forming apparatus 200 generates the confidential document according to the user setting information set by the user.

Figure 10:
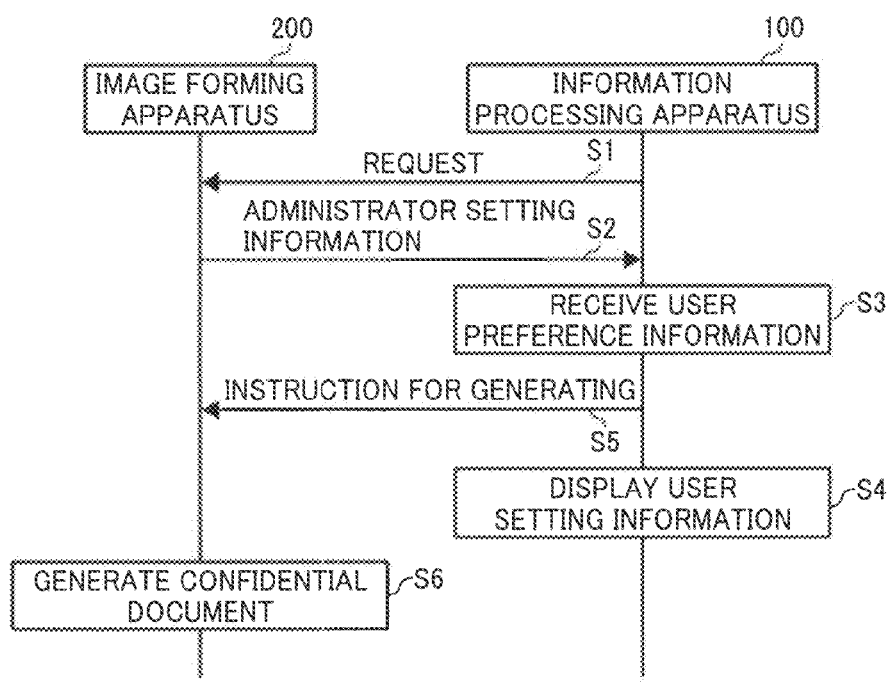
FIG. 10 is a data sequence diagram illustrating operation of generating a confidential document, performed by the confidential document generating system of FIG. 1, is explained according to an example embodiment of the present invention.

Alternatively, as illustrated in FIG. 10, the information processing apparatus 100 may send the user instruction for generating the confidential document as indicated by S5, before displaying the user setting information to the user as indicated by S4. Alternatively, the user setting information may be displayed to the user at any other desired time.

In the example illustrated in FIG. 9, the information processing apparatus 100 obtains all contents of the administrator setting information from the image forming apparatus 200. Alternatively, the information processing apparatus 100 may obtain only a portion of the administrator setting information from the image forming apparatus 200. For example, the information processing apparatus 100 may send a request to the image forming apparatus 100, which requests the image forming apparatus 200 to send the administrator setting information for a specific setting item selected from the plurality of setting items of the administrator setting information. Assuming that the administrator setting information for the deterrent pattern is requested, the image forming apparatus 200 reads out a portion of the administrator setting information that relates to the deterrent pattern such as the setting items of the deterrent pattern, deterrent characters, and pattern color, and sends the obtained portion of the administrator setting information to the information processing apparatus 100.

<Example Operations of Confidential Document Generating System>

Referring now to FIGS. 11 to 21, operation of generating the confidential document, performed by the confidential document generating system 500, is explained according to an example embodiment of the present invention. For the illustrative purpose, it is assumed that the deterrent or control pattern is added to the image data before printing the image data as the confidential document.

<Administrator Setting Information and User Setting Information>

As illustrated in FIG. 11, the administrator setting information and the user setting information may each include the pattern ON/OFF information and the setting item information. In this example, the setting item information includes a plurality of setting items of control pattern, deterrent pattern, deterrent characters, pattern color, and control code, and the value that corresponds to each one of the plurality of setting items.

The pattern ON/OFF information determines whether the pattern should be added to the image data. The ON value indicates that the pattern should be added, while the OFF value indicates that the pattern is not required to be added. When the pattern ON/OFF information for the administrator setting information is "ON", the pattern ON/OFF information for the user setting information is forced to set to "ON", or "REQUIRED".

The control pattern setting item indicates whether the control pattern should be added to the image data when the pattern is to be added. As described above, the control pattern includes information to be used for controlling the output of the confidential document. The ON value indicates that the control pattern should be added, while the OFF value indicates that the control pattern is not added.

The deterrent pattern setting item indicates whether the deterrent pattern should be added to the image data when the pattern is to be added. As described above, the deterrent pattern is to be made visible to the human eye when the confidential document is copied. The ON value indicates that the deterrent pattern should be added, while the OFF value indicates that the deterrent pattern is not added.

The deterrent characters setting item indicates one or more characters to be added when the deterrent pattern is to be added. The "COPY" value, "Confidential" value, and "VOID" value respectively indicate that the character strings "COPY", "Confidential", and "VOID" to be added as the deterrent pattern. When any one of the "COPY", "Confidential", and "VOID" values is selected, the deterrent characters setting item is set to have the "SET" value in FIG. 6. The "NOT SET" value indicates that no characters to be used is set. In such case, the deterrent characters setting item is set to have the "NOT SET" value in FIG. 6.

The pattern color setting item indicates the color of the pattern to be added when the pattern is to be added. The "BLACK" value, "CYAN" value, and "MAGENTA" value respectively indicate that the pattern is to be added in the black color, cyan color, and magenta color. When any one of the "BLACK", "CYAN", and "MAGENTA" values is selected, the pattern color setting item is set to have the "SET" value in FIG. 6. The "NOT SET" value indicates that no pattern color to be used is set. In such case, the pattern color setting item is set to have the "NOT SET" value in FIG. 6.

The control code setting item indicates a specific control code to be added as the control pattern when the pattern is to be added as the control pattern. The code "1" indicates that the confidential document is prohibited from copying, data transmission, and storage. The code "2" indicates that the confidential document is prohibited from data transmission and storage. The code "3" indicates that the confidential document is prohibited from data transmission. When any one of the codes "1", "2", and "3" is selected, the control code setting item is set to have the "SET" value in FIG. 6. The "NOT SET" value indicates that no control code to be used is set. In such case, the control code setting item is set to have the "NOT SET" value in FIG. 6.

In this example, when the pattern ON/OFF information for the user setting information is forced to set to "ON", some setting items such as the deterrent characters setting item or the pattern color setting item may be allowed for modification by the user at the information processing apparatus 100. With this function, the confidential document may be generated according to the user preference set by the user while satisfying the requirement set by the administrator at the same time.

<Operation of Setting Administrator Setting Information>

Still referring to FIG. 11, operation of setting the administrator setting information is explained according to an example embodiment of the present invention.

In the example illustrated in FIG. 11, it is assumed that the pattern ON/OFF information for the administer setting information is set to "OFF" by default, as indicated by the underline. As the default type of the pattern to be added when the pattern is to be added, the deterrent pattern is selected as indicated by the underline. Accordingly, when the administrator setting information having such default values is to be displayed to the administrator, for example, through the operation device 250, the screen of FIG. 12 may be displayed. More specifically, when the "pattern" tab is selected by the administrator, the image forming apparatus 200 or any other apparatus displays the screen of FIG. 12 including the button indicating the "OFF" value for the pattern ON/OFF item based on the default "OFF" value of the pattern ON/OFF information, and the pull down menu initially displaying the "deterrent pattern" for the pattern type based on the default selection of the deterrent pattern.

Figure 12:
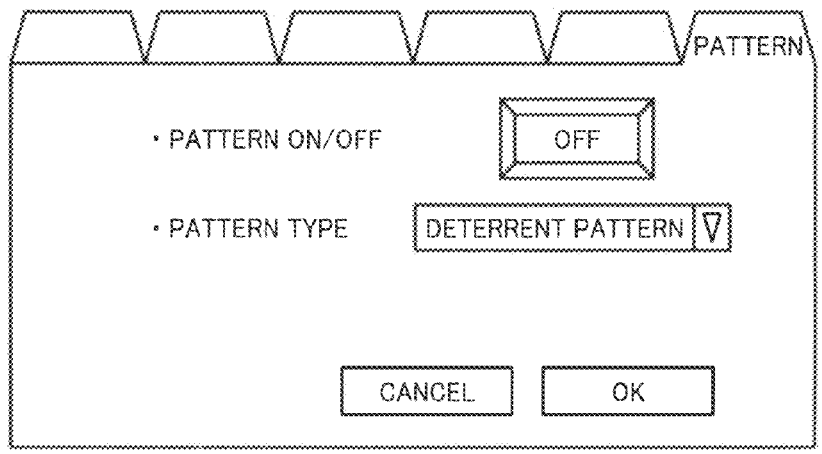
FIG. 12 is an illustration for explaining a screen for setting the administrator setting information.
Figure 13:
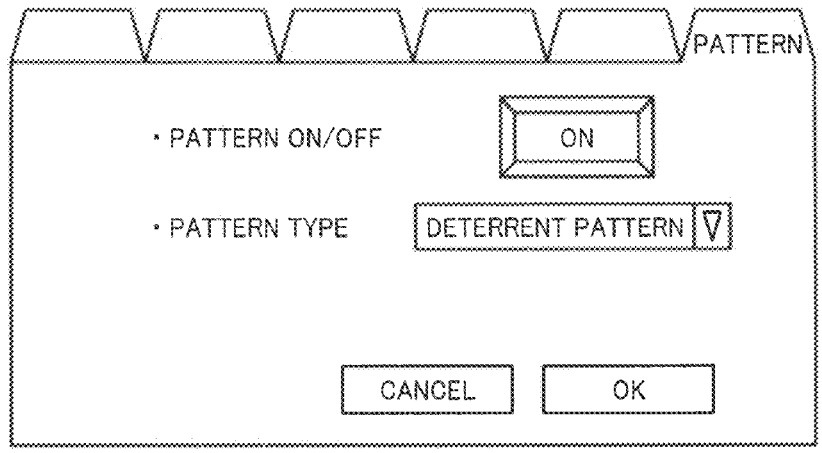
FIG. 13 is an illustration for explaining a screen for setting the administrator setting information.

When the administrator causes the button indicating the "OFF" to be "ON", for example, by clicking the button with the mouse or touching the touch panel, the screen of FIG. 12 is switched to the screen of FIG. 13. When the "OK" button is selected from the screen of FIG. 13, the image forming apparatus 200 may display the screen of FIG. 14, which additionally displays the pattern color setting item and the deterrent characters setting item. The screen of FIG. 14 does not include the control code setting item as it does not correspond to the deterrent pattern.

As illustrated in FIG. 11, in this example, the pattern color setting item is set to have the "BLACK" color by default, and the deterrent characters setting item is set to have the "COPY" by default. Based on these default values, the screen of FIG. 14, which is initially displayed upon selection of the "OK" button of FIG. 13, initially selects the black color for the pattern color setting item, and the "COPY" for the deterrent characters. When the "CANCEL" button is selected from the screen of FIG. 13, the image forming apparatus 200 returns to the screen of FIG. 12, while resetting the value to be the default value.

Figure 15:
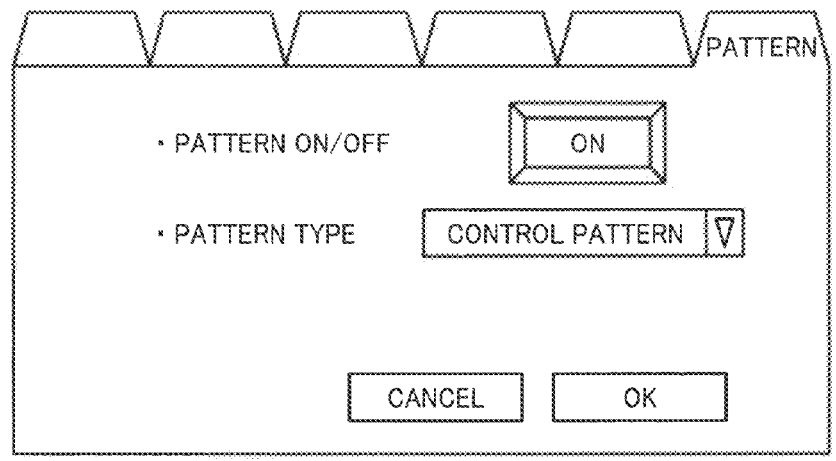
FIG. 15 is an illustration for explaining a screen for setting the administrator setting information.
Figure 16:
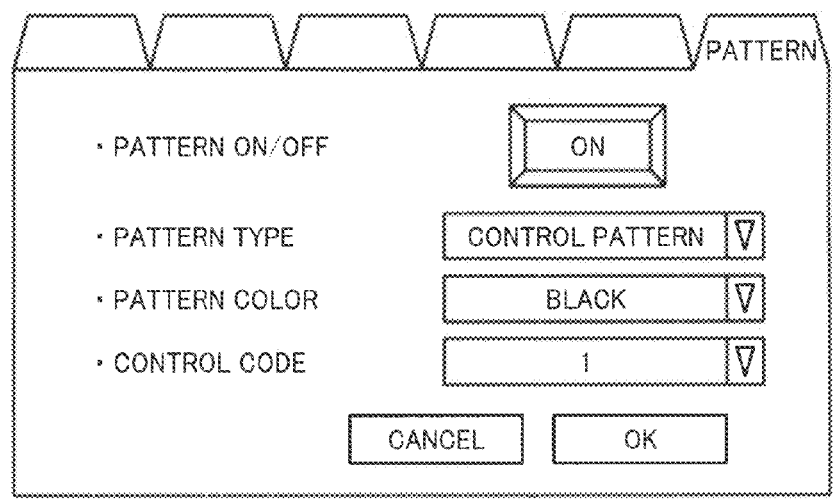
FIG. 16 is an illustration for explaining a screen for setting the administrator setting information.

Referring to FIG. 12, when the "ON" button is set and the control pattern is selected from the pull down menu, the screen of FIG. 12 is switched to the screen of FIG. 15. When the "OK" button is selected from the screen of FIG. 15, the image forming apparatus 200 displays the screen of FIG. 16, which additionally displays the pattern color setting item, and the control code setting item. The screen of FIG. 16 does not include the deterrent characters setting item as it does not correspond to the control code pattern.

As illustrated in FIG. 11, in this example, the pattern color setting item is set to have the "BLACK" color by default, and the control code setting item is set to have the "1" by default. Based on these default values, the screen of FIG. 16, which is initially displayed upon selection of the "OK" button of FIG. 15, initially selects the black color for the pattern color setting item, and the "1" for the control code setting item. When the "CANCEL" button is selected from the screen of FIG. 15, the image forming apparatus 200 returns to the screen of FIG. 12, while resetting the value to be the default value.

Figure 14:
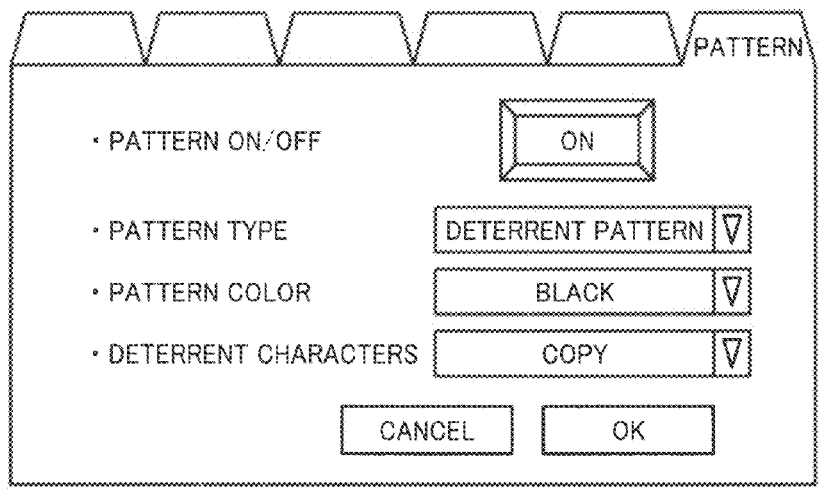
FIG. 14 is an illustration for explaining a screen for setting the administrator setting information.
Figure 17:
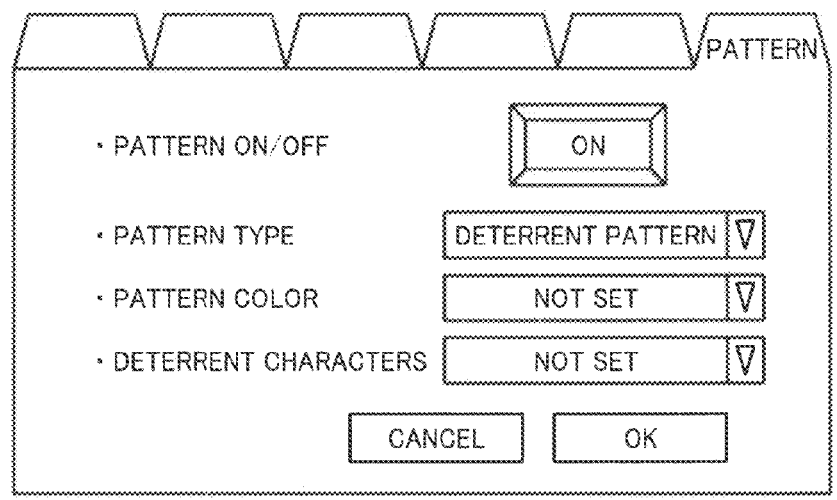
FIG. 17 is an illustration for explaining a screen for setting the administrator setting information

In one example of the administrator setting information, when the image forming apparatus 200 displays the screen of FIG. 14, the administrator may cause the pattern color setting item and the deterrent characters setting item to be each set to have the value "NOT SET" as illustrated in FIG. 17. When the "OK" button is selected from the screen of FIG. 17, the image forming apparatus 200 stores the administrator setting information that reflects the setting input by the administrator through the screen of FIG. 17 in the storage section 202. For example, the administrator setting information that reflects the setting items selected through the screen of FIG. 17 may be stored in a table illustrated in FIG. 18.

Referring to FIG. 18, the pattern ON/OFF information indicates that the pattern is to be added. The setting item information indicates that the control pattern setting item has the "NOT SET" value, the deterrent pattern setting item has the "SET" value, the deterrent characters setting item has the "NOT SET" value, the pattern color setting item has the "NOT SET" value, and the control code pattern item has the "NOT SET" value.

When the administrator setting information of FIG. 18 is sent to the information processing apparatus 100, the setting for the deterrent pattern setting item cannot be changed by the information processing apparatus 100 as the deterrent pattern setting item has the "SET" value. For the other setting items of control pattern, deterrent characters, pattern color, and control code, each having the "NOT SET" value, the setting can be modified using the information processing apparatus 100.

Referring back to FIG. 17, when the "CANCEL" button is selected, the image forming apparatus 200 switches to the screen of FIG. 14, while changing the values of the pattern color setting item and the deterrent characters setting item back to be the default values.

<Operation of Setting User Setting Information>

Referring to FIG. 11, operation of setting the user setting information is explained according to an example embodiment of the present invention. In this example, it is assumed that the administrator setting information is previously set as illustrated in FIG. 18.

In order to set the user setting information, the user may request the information processing apparatus 100 to display a screen for setting, for example, by calling the print driver application. In such case, the screen similar to the one illustrated in FIG. 19 may be displayed. When the "pattern" tab is selected by the user, the information processing apparatus 100 sends a request to the image forming apparatus 200 for the administrator setting information. In response, the information processing apparatus 100 obtains the administrator setting information, such as the administrator setting information illustrated in FIG. 11 or FIG. 18. Based on the administrator setting information, the information processing apparatus 100 generates the screen of FIG. 19 for display to the user.

Referring to FIG. 18, the pattern ON/OFF information is set to "ON", the deterrent pattern setting item is set to "SET", and the other setting items are each set to "NOT SET". Further, as illustrated in FIG. 11, the default values of the administrator setting information includes the "OFF" value of the pattern ON/OFF information, the "COPY" value of the deterrent characters setting item, the "BLACK" value of the pattern color setting item, the "1" value of the control code setting item, and the "SET" value of the deterrent pattern setting item.

Figure 19:
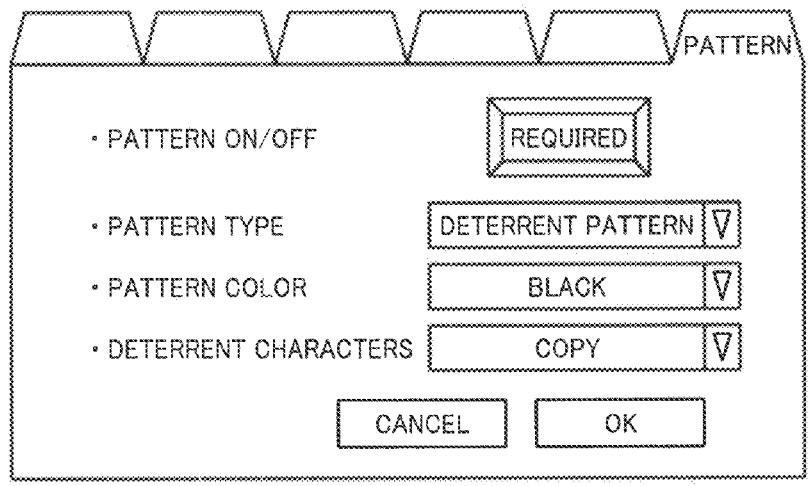
FIG. 19 is an illustration for explaining a screen for setting user setting information.

Based on the administrator setting information of FIGS. 11 and 18, the information processing apparatus 100 may generate the screen of FIG. 19. With this information, the user can easily recognize the requirement set by the administrator. More specifically, in this example, as the pattern ON/OFF information for the administrator setting information is "ON", the information processing apparatus 100 displays the button indicating that the addition of the pattern is required ("REQUIRED"). With this information, the user can easily recognize that the addition of the pattern is required by the administrator. Additionally, the information processing apparatus 100 may cause the "REQUIRED" button to be not modifiable by the user such that it cannot be switched to the "OFF" value.

Referring back to FIG. 11, since the default values set by the administrator includes the deterrent pattern value for the pattern type, the information processing apparatus 100 displays the pull down menu, which initially displays the deterrent pattern setting item. Further, referring back to FIG. 18, the administrator setting information indicates that the deterrent pattern setting item has the "SET" value. Accordingly, the information processing apparatus 100 causes the pull down menu for the pattern type to be not selectable such that the other pattern type is not shown to the user or the other option corresponding to the "NOT SET" value is not shown to the user. In replace of the setting item information of the administrator setting information, the information processing apparatus 100 may use the information indicating whether modification is allowed ("ALLOWED" or "NOT ALLOWED" in FIG. 6).

Still referring to FIG. 18, the deterrent characters setting item and the pattern color item are respectively set to "NOT SET". Further, referring to FIG. 11, the administrator setting information further indicates that the deterrent characters setting item and the pattern color item respectively have the default values of "COPY" and "BLACK". Accordingly, the pull down menu for the pattern color setting item initially displays the "BLACK", while allowing the user to see the other options by scrolling. The pull down menu for the deterrent characters setting item initially displays the "COPY", while allowing the user to see the other options by scrolling. In replace of the setting item information of the administrator setting information, the information processing apparatus 100 may use the information indicating whether modification is allowed ("ALLOWED" or "NOT ALLOWED" in FIG. 6). With this function, the user can easily recognize which one of the items being displayed is modifiable.

In order to modify, the user may change the pattern color for the pattern color setting item from "BLACK" to "CYAN" using the input section 103. In a similar manner, the user may change the deterrent characters for the deterrent characters setting item from "COPY" to "VOID" using the input section 103. Accordingly, the screen of FIG. 19 is switched to the screen of FIG. 20. When the user further selects the "OK" button of FIG. 20, the information processing apparatus 100 may store the user setting information that reflects the user preference information input through the input section 103 in the storage section 104. The user setting information may be stored, for example, in the form of table illustrated in FIG. 21.

Referring to FIG. 21, the user setting information indicates that the pattern ON/OFF information is set to "REQUIRED" indicating that the pattern is forced to be added. The setting item information indicates that the control pattern setting item has the "NOT SET" value, the deterrent pattern setting item has the "SET" value, the deterrent characters setting item has the "VOID" value, the pattern color setting item has the "CYAN" value, and the control code pattern item has the "NOT SET" value.

Once the user setting information is set, the user may further instruct the information processing apparatus 100 to send a user instruction for generating the confidential document to the image forming apparatus 200. In response, the information processing apparatus 100 generates a print job that includes the image data to be output and the control data that reflects the user setting information of FIG. 21, and sends the print job to the image forming apparatus 200. For example, the information processing apparatus 100 may send information regarding the pattern color of "CYAN" and the deterrent characters of "VOID".

When the user instruction is received, the image forming apparatus 200 generates the plurality of patterns according to the user setting information, adds the plurality of patterns to the image data, and forms an image of the image data onto a recording sheet.

For example, the image forming apparatus 200 may generate a pattern image layer having the plurality of patterns generated according to the user setting information, and combines the pattern image layer with the image data to generate a combined image. Based on the combined image, the confidential document added with the pattern is output.

As described above referring to FIGS. 1 to 21, the confidential document generating system 500 is capable of allowing the user to freely set at least one of a plurality of setting items without causing any conflict with the requirement set by the administrator.

Figure 22A:
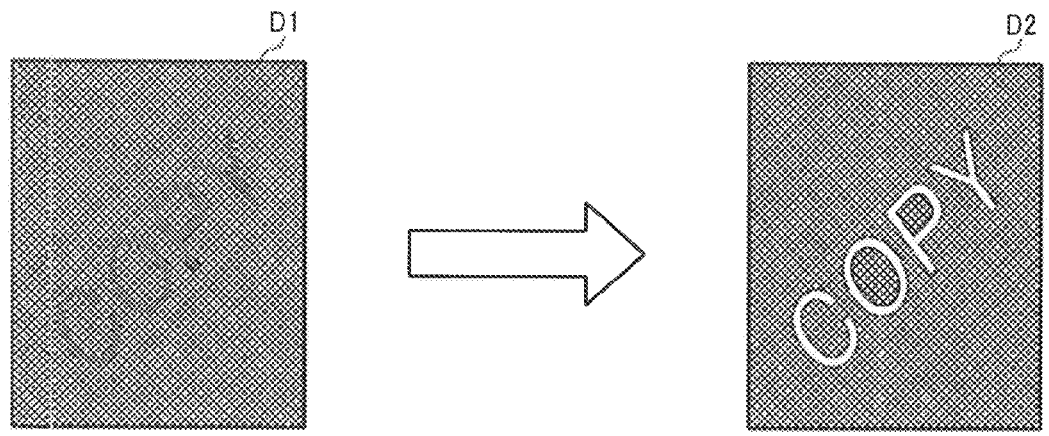
FIG. 22A is an illustration for explaining confidential document data embedded with a deterrent pattern, and the copied document of the confidential document data embedded with a deterrent pattern.
Figure 22B:
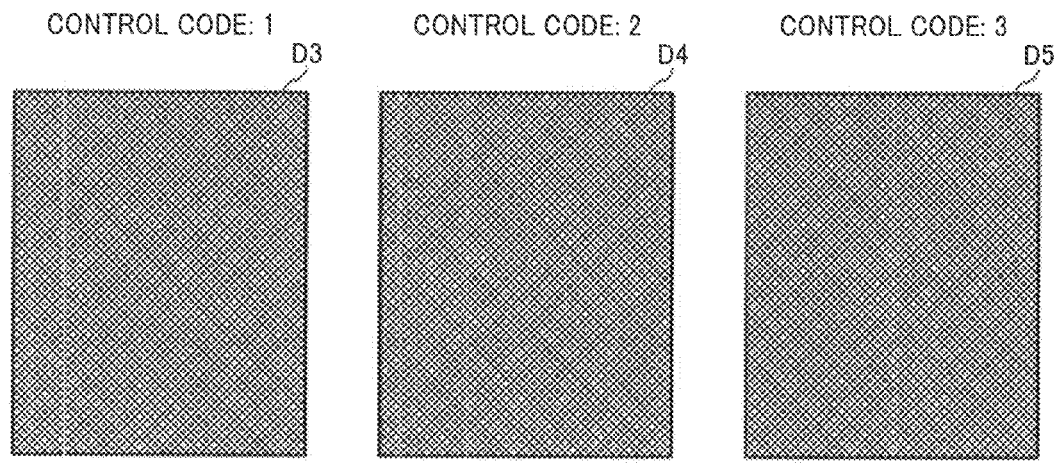
FIG. 22B is an illustration for explaining confidential document data embedded with a control pattern.

Further, the confidential document generating system 500 allows the user to easily recognize how the confidential document is to be output. Since the pattern to be added to the image data is so small that it is not perceptible to the human eye, providing such information may be advantageous. For example, as illustrated in FIG. 22A, even when the user sees the confidential document D1 added with the deterrent pattern, the user cannot recognize the specifics of the deterrent pattern unless the copy D2 of the confidential document is obtained. In another example, as illustrated in FIG. 22B, even when the user sees the confidential documents D3, D4, and D5 respectively added with the control pattern having the control code of 1, 2, and 3, the user cannot recognize the specifics of the control pattern unless the user tries to output the confidential document.

Figure 20:
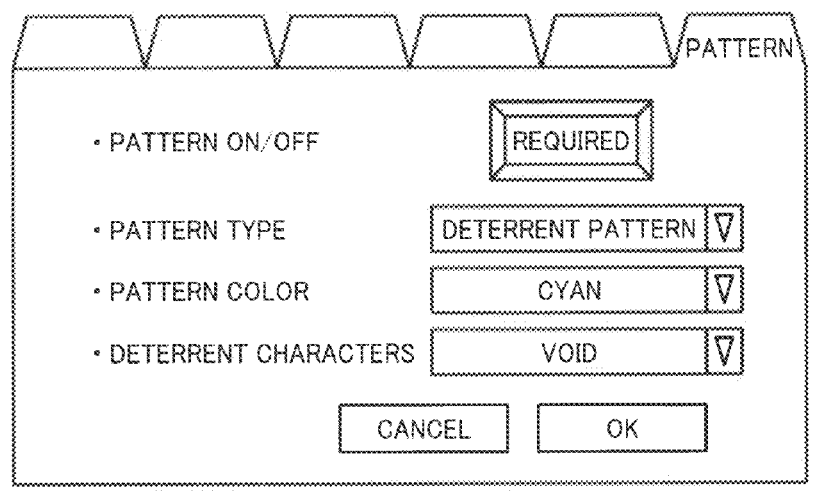
FIG. 20 is an illustration for explaining a screen for setting user setting information.

In the above-described examples, the information processing apparatus 100 displays the user setting information, which is the administrator setting information being modified with the user preference information, to the user in the form of text information, for example, as illustrated in FIG. 20.

Alternatively or additionally, the information processing apparatus 100 may display the user setting information in the form of graphical image data, for example, by generating the image data that reflects the user setting information. In such case, as illustrated in FIG. 23, the information processing apparatus 100 may be additionally provided with an image data generating section 108, which provides the function of generating the confidential document according to the user setting information.

<Information Processing Apparatus 100: Functional Structure>

Figure 23:
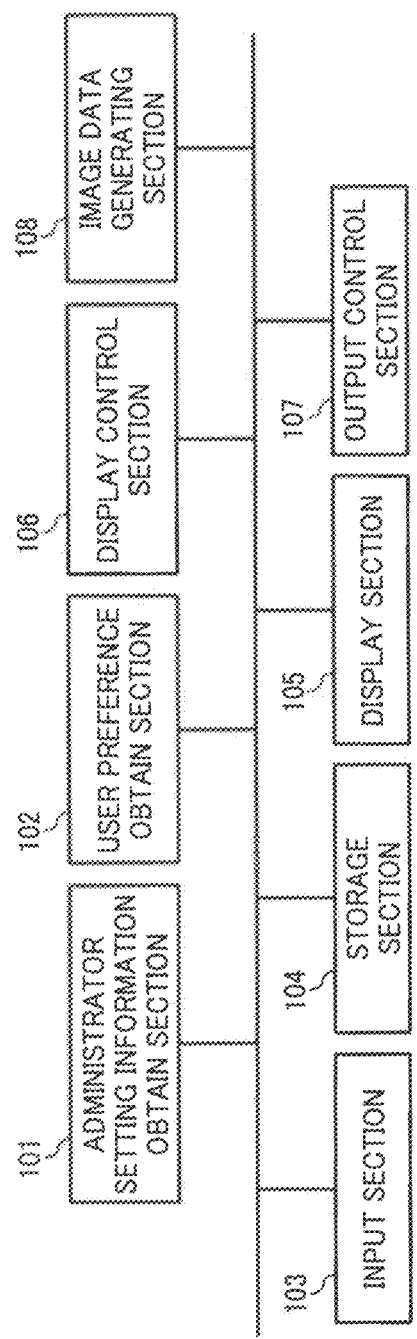
FIG. 23 is a functional structure of the information processing apparatus of FIG. 1 according to an example embodiment of the present invention.

Referring to FIG. 23, the image data generating section 108 generates image data that reflects the user setting information, which is the administrator setting information modified with the user preference information obtained by the user preference obtain section 102. The function of the image data generating section 108 may be performed by the controller 110 of FIG. 2.

When the image data that reflects the user setting information is generated, the display control section 106 may control the display of the image data that reflects the user setting information through the display section 105. With this function, the user can easily recognize the user setting information to be used for generating the confidential document.

For example, in order to reflect the user setting information, the image data generating section 108 may previously assign a specific image component for each one of the specific parameter value of the specific setting item. For example, in order to reflect the addition of the control pattern, a graphical image that corresponds to the control pattern may be previously determined. In another example, in order to reflect the specific control code, numeral data corresponding to the specific control code may be previously determined such that the graphical image corresponding to the control pattern may be displayed with the numerical data. In another example, in order to reflect the specific pattern color, color data corresponding to the specific pattern color may be previously determined such that the graphical image corresponding to the control pattern may be displayed in the color defined by the color data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In the above-described examples, the user is not allowed to modify the setting item information, when the setting item information is set by the administrator. More specifically, as illustrated in FIG. 6, any one of the setting items having the "NOT SET" values is not allowed for modification by the user.

In such case, the information processing apparatus 100 does not have to be provided with all contents of the administrator setting information as long as the information processing apparatus 100 obtains information regarding which one of the setting items is modifiable by the user.

For example, as illustrated in FIG. 24, it is assumed that a plurality of setting items including the setting items 1 to 10 is available. FIG. 24(a) illustrates the administrator setting information set by the administrator, for example, using the image forming apparatus 200. Referring to FIG. 24(a), the setting items 1, 3, 5, 6, 7, 9, and 10 each have the "SET" value and the setting items 2, 4, and 8 each have the "NOT SET" value. In such case, the image forming apparatus 200 requests the user to input the parameter values for the setting items 2, 4, and 8 through the information processing apparatus 100. In such case, the user preference information includes the values for the setting items 2, 4, and 8 as illustrated in FIG. 24(b). When the values for the setting items 2, 4, and 8 are obtained from the information processing apparatus 100, the image forming apparatus 200 obtains the user setting information by modifying the administrator setting information of FIG. 24(a) with the user preference information of FIG. 24(b). Further, the image forming apparatus 200 generate a pattern image layer including a plurality of patterns being generated based on the user setting information, and combines the pattern image layer with the original image data to generate a confidential document in the electronic format. The image forming apparatus 200 further outputs the confidential document as a printed document.

Alternatively, the administrator does not have to input the "SET" or "NOT SET" values for all of the setting items of the administrator setting information. For example, as illustrated in FIG. 25(a), the administrator setting information may cause the setting items 1, 2, 3, 4, and 7 to each have the "SET" value, and the setting item 8 to have the "NOT SET" value. The setting items 5, 6, 9, and 10 do not have either the "SET" value or the "NOT SET" value as no information is entered by the administrator. In such case, as illustrated in FIG. 25(b), the user is requested to input the parameter values for the setting items 5, 6, 3, 9, and 10. When the values for the setting items 5, 6, 8, 9, and 10 are obtained from the information processing apparatus 100, the image forming apparatus 200 generates the user setting information by modifying the administrator setting information of FIG. 25(a) with the user preference information of FIG. 25(b).

In another example, referring back to FIG. 11, the administrator may cause more than one parameter values for the deterrent character setting items to be modifiable by the user. For example, the "COPY" value and the "CONFIDENTIAL" value may be caused to be modifiable by the user, while the "VOID" value and the "NOT SET" value is not modifiable by the user.

In another example, the information processing apparatus 100 may send a request for the administrator setting information to the image forming apparatus 100 at any time other than the example case in which the request is sent when the "pattern" tab is selected by the user as described above referring to FIG. 19. For example, the information processing apparatus 100 may send the request for the administrator setting information when the user executes the printer driver program. In the case of causing the image forming apparatus 200 to print the image data as the confidential document, it may be preferable for the information processing apparatus 100 to obtain the administrator setting information right before the user inputs a user instruction for generating the confidential document. Alternatively, the image forming apparatus 200 may automatically send the administrator setting information when the administrator setting information is updated by the administrator. With this function, the information processing apparatus 100 has the current version of the administrator setting information.

In the above-described example, the information processing apparatus 100 generates the screen based on the administrator setting information to provide the user with information indicating which one of the setting items is modifiable by the user. Alternatively, the information processing apparatus 100 may request the user to input the user preference information before providing such information indicating which one of the setting items is modifiable by the user or before obtaining the administrator setting information. In such case, the information processing apparatus 100 stores the user preference information in the storage section 104. The information processing apparatus 100 then obtains the administrator setting information from the image forming apparatus 200, and generates the user setting information by modifying the administrator setting information with the user preference information as long as the user preference information satisfies the requirement set by the administrator through the administrator setting information.

For example, as illustrated in FIG. 26, the information processing apparatus 100 may store the user preference information of FIG. 26(b) in the storage section 104. The information processing apparatus 100 obtains the administrator setting information of FIG. 26(a) from the image forming apparatus 200. The information processing apparatus 100 determines whether the setting items having the values input as the user preference information of FIG. 26(b) are modifiable by the user by referring to the values of the corresponding setting items for the administrator setting information of FIG. 26(a). In this example, the setting items 2, 5, and 8 have the values set by the user, and the setting items 2, 5, and 8 all have the "NOT SET" values. Accordingly, the information processing apparatus 100 generates the user setting information of FIG. 26(c) to be used for generating the confidential document.

Further, in the above-described example, the additional information is embedded as the plurality of patterns, which may be in the form of control pattern or deterrent pattern. Alternatively, the additional information may be embedded in any desired form including, for example, by modifying the intercharacter spaces of the original image data or modifying at least a portion of the character present in the original image data, or in the form of code such as a barcode. In alternative to generating the pattern layer image, the additional information may be embedded in any portion of the original image data including, for example, in a background portion of the original image data having no characters or lines, or in the border section of the original image data.

Further, as described above, any one of the above-described and other methods of the present invention may be embodied in the form of a computer program stored in any kind of storage medium. Examples of storage mediums include, but are not limited to, flexible disk, hard disk, optical discs such as CD-ROM and DVD, magneto-optical discs, magnetic tapes or disks, nonvolatile memory cards, semiconductor memory, ROM (read-only-memory), etc. Any portion of such computer program may be downloaded onto any one of the image forming apparatus 200 and the information processing apparatus 100 through the network 500.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In the above-described examples described above referring to FIGS. 1 to 26, it is assumed that the information processing apparatus 100 is capable of receiving information from the image forming apparatus 100 such as the administrator setting information. Alternatively, the information processing apparatus 100 may not be capable of receiving information from the image forming apparatus 100 through the network 300. In such case, the information processing apparatus 100 may receive user setting information set by the user according to the user preference, and send the user instruction for generating the confidential document according to the user setting information to the image forming apparatus 200. The image forming apparatus 200 receives the user instruction, which may include the image data to be processed, and the user setting information set by the user. The image forming apparatus 200 determines whether the user setting information satisfies the requirement set by the administrator through the administrator setting information stored in the storage section 202. When it is determined that the user setting information does not satisfy the requirement set by the administrator, the image forming apparatus 100 cancels the print job requested by the user instruction.

For example, in the image forming apparatus 200, the system controller 210 of FIG. 3 may obtain the pattern on/off information of the administrator setting information from the storage section 202, and further obtain on/off information of the user setting information obtained from the receive section 204. The system controller 210 determines whether the pattern on/off information of the administrator setting information and the pattern on/off information of the user setting information both indicate that the pattern should be added, or the pattern on/off information have the "ON" values for both cases, to generate a determination result. When the determination result indicates that the pattern on/off information for the administrator setting information and the user setting information both indicate that the pattern should be added, the system controller 210 causes other devices such as the image processor 230 not to perform generation of the confidential document, for example, by canceling the print job received from the information processing apparatus 100. When cancelled, the system controller 210 may further cause the communication interface 270 to send an error message to the information processing apparatus 100 to notify the user that the printing job has been canceled. Further, the system controller 210 may store log information indicating that the printing job has been canceled, along with other information related to the printing job such as date/time information, user setting information, or user identification information, etc. In this manner, the user at the information processing apparatus 100 at least knows that the user setting information that has been input by the user does not satisfy the requirement set by the administrator.

In another example, the image forming apparatus 200 may not be provided with the function of forming an image of the confidential document on a recording sheet, or such function of forming may be performed by any device connectable to the image forming apparatus 200.

In another example, the user does not have to use the information processing apparatus 100 to input the user instruction for generating the confidential document. Alternatively, the user may be at the image forming apparatus 200, and directly instructs the image forming apparatus 200 to generate the confidential document through the operation device 250 of FIG. 3. In such case, the user may be required to input user identification information such as the user ID and the user password, for example, through the operation device 250. Alternatively, the user may provide such information using a security card, which may be inserted into a medium reading device when the medium reading device is provided with the image forming apparatus 200. Using the user identification information, the image forming apparatus 200 can identify whether the user who is currently logged onto the system is different from the administrator. However, such user identification information is not required. The image forming apparatus 200 is capable of determining whether the user setting information input by the user satisfies the requirement set by the administrator in a substantially similar manner as described above referring to FIGS. 1 to 26.

The invention claimed is:

1. A confidential document generating system, comprising:
    an image processing apparatus, including
        a user interface device to receive from a user a user instruction for generating a confidential document from image data by adding additional information to the image data;
        a storage device to store administrator setting information set by an administrator of the confidential document generating system, the administrator setting information including administrator on/off information set to "ON" indicating that the additional information is required to be added to the image data to generate the confidential document;
        an image processor to generate the confidential document by adding the additional information; and
        a controller to obtain user setting information set by the user from the user instruction,
        wherein the user interface device of the image processing apparatus is further configured to request the administrator to set a parameter value of at least one of a plurality of setting items, each related to characteristics of the additional information to be added, the plurality of setting items including a deterrent pattern setting item; and the controller of the image processing apparatus is further configured to store administrator setting item information indicating whether the administrator sets the parameter value of the at least one of the plurality of setting items in the storage device; and an information processing apparatus connected to the image processing apparatus through a network and configured to send the user instruction to the image processing apparatus, wherein the information processing apparatus includes an input device to receive user preference information from the user, the user preference information indicating a parameter value of at least one of the plurality of setting items; and a controller configured to send a request for the administrator setting item information stored in the image processing apparatus, to receive over the network in response to the request, the administrator setting item information from the image processing apparatus, to determine which one of the plurality of setting items is allowed for user modification by the administrator using the received administrator setting item information, to generate a determination result before the input device receives the user preference information, wherein, when the parameter value of the deterrent pattern setting item set by the administrator has a value "SET", the controller is configured to generate the determination result indicating that the deterrent pattern setting item is not allowed for user modification and to prohibit the input device from receiving the user preference information indicating the parameter value of the deterrent pattern setting item.

2. The system of claim 1, wherein the controller of the information processing apparatus is further configured to:

cause a display device to display one or more parameter values of at least one of the plurality of setting items that is allowed for user modification by the administrator in a format selectable by the user, and:

cause the input device to receive one of the one or more parameter values of the at least one of the plurality of setting items that is selected by the user from the display device as the user preference information.

3. The system of claim 2, wherein, when the administrator setting item information indicates that the administrator sets the parameter value of at least one of the plurality of setting items, the controller of the information processing apparatus is further configured to cause the display device to display the parameter value of the at least one of the plurality of setting items that is set by the administrator in a format not selectable by the user.

4. The system of claim 3, wherein the information processing apparatus further comprises:

a storage device to store the administrator setting information received from the image processing apparatus, wherein:

the controller of the information processing apparatus is further configured to generate, for each one of the plurality of setting items, information indicating whether each one of the plurality of setting items is allowed for user modification by the administrator using the administrator setting item information of the administrator setting information, and to store the information indicating whether each one of the plurality of setting items is allowed for user modification by the administrator in the storage device as the determination result.

5. The system of claim 4, wherein the information processing apparatus further comprises:

an image data generating device to generate graphical data that reflects the user setting information, wherein the controller is further configured to display the graphical data in addition to the user setting information through the display device.

6. The system of claim 5, wherein the image processing apparatus further comprises:

an image forming device to output the confidential document as a printed document.

7. An information processing apparatus connected to an image processing apparatus through a network to together form a confidential document generating system configured to generate a confidential document from image data by adding additional information to the image data, the information processing apparatus comprising:

a communication device to receive administrator setting information set by an administrator from the image processing apparatus, the administrator setting information including administrator on/off information set to "ON" indicating that the additional information is required to be added to the image data to generate the confidential document and administrator setting item information indicating whether the administrator has set a parameter value of at least one of a plurality of setting items each related to characteristics of the additional information to be added, the administrator setting item information indicating which of the plurality of setting items can be set by a user, wherein the plurality of setting items includes a deterrent pattern setting item;

an input device to receive user preference information from the user, the user preference information indicating a parameter value of at least one of the plurality of setting items; and a controller to send a request for the administrator setting item information stored in the image processing apparatus, to receive over the network in response to the request, the administrator setting item information from the image processing apparatus, to determine which one of the plurality of setting items is allowed for user modification by the administrator using the received administrator setting item information, to generate a determination result before the input device receives the user preference information, wherein, when the parameter value of the deterrent pattern setting item set by the administrator has a value "SET", the controller is configured to generate the determination result indicating that the deterrent pattern setting item is not allowed for user modification and to prohibit the input device from receiving the user preference information indicating the parameter value of the deterrent parameter setting item.

8. The apparatus of claim 7, wherein the controller is further configured to:

cause a display device to display one or more parameter values of at least one of the plurality of setting items that is allowed for user modification by the administrator in a format selectable by the user, and cause the input device to receive one of the one or more parameter values of the at least one of the plurality of setting items that is selected by the user from the display device as the user preference information.

9. The apparatus of claim 8, wherein, when the administrator setting item information indicates that the administrator sets the parameter value of at least one of the plurality of setting items, the controller is further configured to cause the display device to display the parameter value of the at least one of the plurality of setting items that is set by the administrator in a format not selectable by the user.

10. The apparatus of claim 9, further comprising:
a storage device to store the administrator setting information received from the image processing apparatus, wherein:
the controller is further configured to generate, for each one of the plurality of setting items, information indicating whether each one of the plurality of setting items is allowed for user modification by the administrator using the administrator setting item information of the administrator setting information, and to store the information indicating whether the each one of the plurality of setting items is allowed for user modification by the administrator in the storage device as the determination result.

11. The apparatus of claim 10, further comprising:
an image data generating device to generate graphical data that reflects the user setting information,
wherein the controller is further configured to display the graphical data in addition to the user setting information through the display device.

12. A confidential document generating method performed by a confidential document generating system, the method comprising:
receiving from a user a user instruction for generating a confidential document from image data by adding additional information to the image data;
storing administrator setting information set by an administrator of the confidential document generating system in a storage device of an image processing apparatus, the administrator setting information including administrator on/off information set to "ON" indicating that the additional information is required to be added to the image data to generate the confidential document;
providing an image processor to generate the confidential document by adding the additional information;
storing administrator setting item information indicating whether the administrator sets a parameter value of at least one of a plurality of setting items in the storage device;
receiving user preference information from the user through an input device, the user preference information indicating a parameter value of at least one of the plurality of setting items each related to characteristics of the additional information to be added, the plurality of setting items including a deterrent pattern setting item;
sending, to the image processing apparatus, a request for the administrator setting item information stored in the image processing apparatus;
receiving over a network in response to the request, the administrator setting item information from the image processing apparatus;
determining which one of the plurality of setting items is allowed for user modification by the administrator using the received administrator setting item information to generate a determination result before receiving the user preference information; and
wherein, when the parameter value of the deterrent pattern setting item set by the administrator has a value "SET", generating the determination result indicating that the deterrent pattern setting item is not allowed for user modification and prohibiting the input device from receiving the user preference information indicating the parameter value of the deterrent pattern setting item.

13. The method of claim 12, further comprising:
generating graphical data that reflects the user setting information; and
displaying the graphical data in addition to the user setting information through a display device.

14. The information processing apparatus of claim 7, wherein the controller is configured to allow the input device to receive the user preference information indicating respective parameter values of at least one of a control pattern setting item, a deterrent characters setting item, a pattern color setting item, and a control code setting item.

* * * * *